(12) United States Patent
Kellock et al.

(10) Patent No.: US 7,702,014 B1
(45) Date of Patent: Apr. 20, 2010

(54) SYSTEM AND METHOD FOR VIDEO PRODUCTION

(75) Inventors: Peter Rowan Kellock, Singapore (SG); Srikumar Karaikudi Subramaniam, Singapore (SG); Ramanath Padmanabhan, Singapore (SG); Liang Kee Goh, Singapore (SG)

(73) Assignee: Muvee Technologies Pte. Ltd., Singapore (SG)

( * ) Notice: Subject to any disclaimer, the term of this patent is extended or adjusted under 35 U.S.C. 154(b) by 0 days.

(21) Appl. No.: 09/509,280

(22) PCT Filed: Dec. 16, 1999

(86) PCT No.: PCT/SG99/00142

§ 371 (c)(1),
(2), (4) Date: Mar. 27, 2000

(87) PCT Pub. No.: WO01/45391

PCT Pub. Date: Jun. 21, 2001

(51) Int. Cl.
*H04B 1/66* (2006.01)

(52) U.S. Cl. ............... 375/240.08; 375/240.01; 386/96; 386/54; 386/108; 386/104; 386/52; 386/69; 386/95; 386/55

(58) Field of Classification Search ............ 375/240.08, 375/240.01; 386/46, 96, 54, 52, 108, 104, 386/69, 95, 55
See application file for complete search history.

(56) References Cited

U.S. PATENT DOCUMENTS

| | | |
|---|---|---|
| 4,780,709 A | 10/1988 | Randall |
| 5,262,865 A | 11/1993 | Herz |
| 5,267,034 A | 11/1993 | Miyatake et al. |
| 5,286,908 A | 2/1994 | Jungleib |
| 5,303,041 A | 4/1994 | Nishimura |
| 5,309,228 A | 5/1994 | Nakamura |
| 5,537,530 A | 7/1996 | Edgar et al. |
| 5,693,902 A | 12/1997 | Hufford et al. |
| 5,801,685 A | 9/1998 | Miller et al. |
| 5,805,733 A | 9/1998 | Wang et al. |
| 5,861,880 A | 1/1999 | Shimizu et al. |
| 5,877,445 A | 3/1999 | Hufford et al. |

(Continued)

FOREIGN PATENT DOCUMENTS

GB 2329812 A 3/1999

(Continued)

OTHER PUBLICATIONS

Nack et al., "Der kommande Standard zur Beschreibung multimedialer—MPEG-7," Mar. 1999.

(Continued)

*Primary Examiner*—Shawn An
(74) *Attorney, Agent, or Firm*—Woods, Phillips, Katz, Clark & Mortimer

(57) ABSTRACT

A system for processing video segments is disclosed. The system includes a descriptor instantiator for creating a descriptor and ascribing at least one value thereto for a corresponding video segment. The system also includes a video constructor for assembling an output video production from at least two video segments, including means for selecting the at least two video segments according to values of at least one descriptor corresponding to the at least two video segments and means for sequencing the at least two video segments according to values of at least one descriptor corresponding to the at least two video segments.

57 Claims, 17 Drawing Sheets

U.S. PATENT DOCUMENTS

| | | | |
|---|---|---|---|
| 5,969,716 A | 10/1999 | Davis et al. | |
| 6,026,389 A | 2/2000 | Nakajima et al. | |
| 6,067,401 A * | 5/2000 | Abecassis | 386/125 |
| 6,078,005 A | 6/2000 | Kurakake et al. | |
| 6,137,483 A | 10/2000 | Kiyono et al. | |
| 6,163,510 A | 12/2000 | Lee et al. | |
| 6,243,087 B1 | 6/2001 | Davis et al. | |
| 6,310,839 B1 | 10/2001 | Lee et al. | |
| 6,320,598 B2 | 11/2001 | Davis et al. | |
| 6,353,170 B1 | 3/2002 | Eyzaguirre et al. | |
| 6,377,519 B1 | 4/2002 | Lee et al. | |
| 6,463,207 B1 * | 10/2002 | Abecassis | 386/70 |
| 6,542,869 B1 | 4/2003 | Foote | |
| 6,549,643 B1 | 4/2003 | Toklu et al. | |
| 6,686,970 B1 | 2/2004 | Windle | |
| 6,697,523 B1 | 2/2004 | Divakaran et al. | |
| 6,697,564 B1 | 2/2004 | Toklu et al. | |
| 6,698,970 B2 | 3/2004 | Guillemet et al. | |
| 6,757,027 B1 | 6/2004 | Edwards et al. | |

FOREIGN PATENT DOCUMENTS

| | | |
|---|---|---|
| WO | WO 98/05034 A1 | 2/1998 |
| WO | WO 00/39997 A2 | 7/2000 |

OTHER PUBLICATIONS

EPO Communication dated Nov. 11, 2005, re EP 99 962 635.1 (which corresponds to U.S. Appl. No. 09/509,280).

Parkes, Alan P., "Temporal Viewpoints for Video-Based Question Answering", 1993 (presented as Culture, Technology, Interpretation: the Challenge of Multimedia, Trinity College, Dublin, Ireland).

Chua, Tat-Seng and Li-Qun Ruan, "A Video Retrieval and Sequencing System". Feb. 5, 2001.

Ahanger, G. and T.D.C. Little, Automatic Composition Techniques for Video Production, Dec. 30. 1998.

Pfeiffer, S., R. Lienhart, S. Fischer and W. Effelsberg, "Abstracting Digital Movies Automatically". May 1996.

Nack, Frank-Michael, AUTEUR: "The Application of Video Semantics and Theme Representation for Automated Film Editing", Aug. 1996.

* cited by examiner

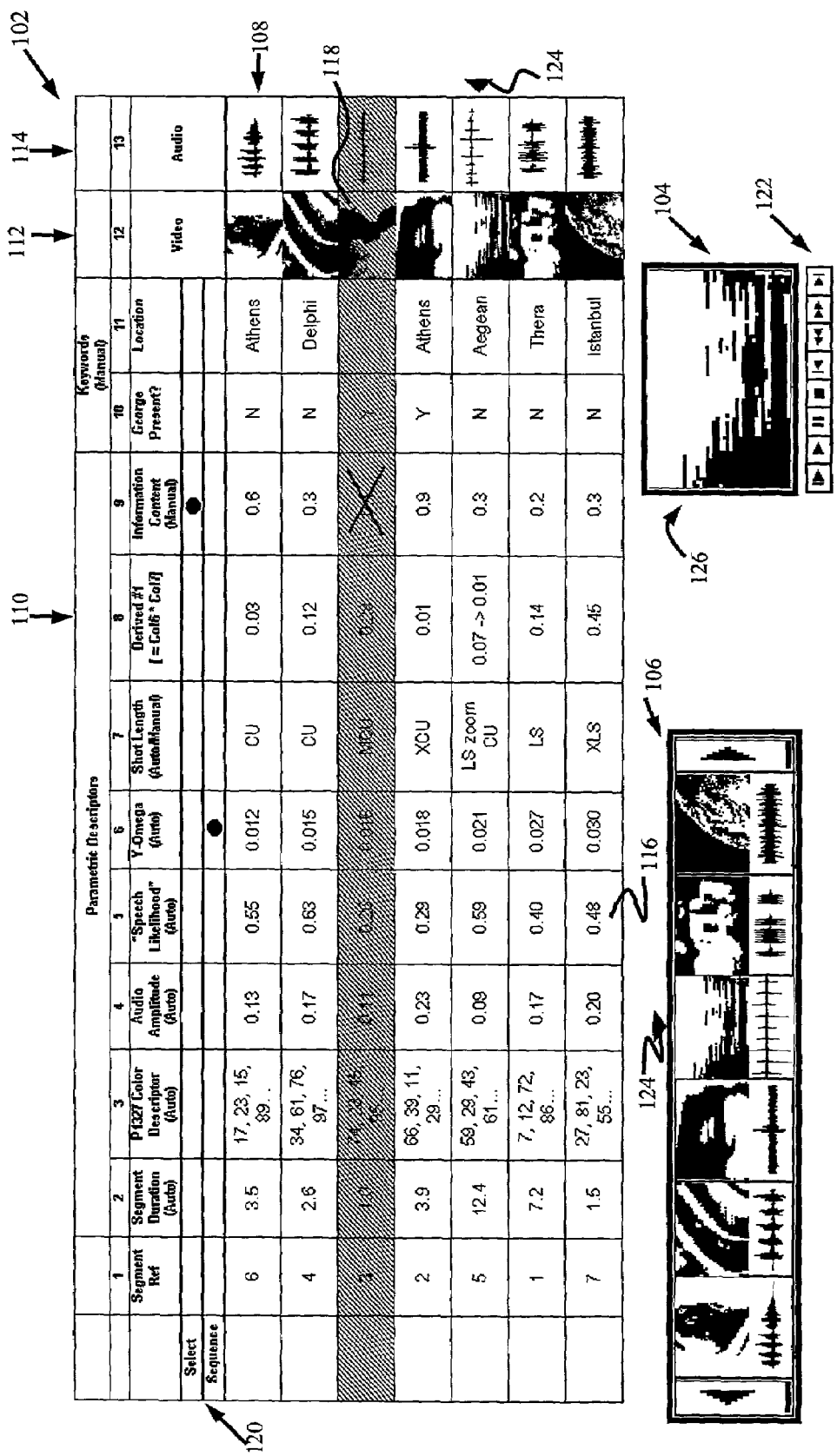
FIG. 1a – GRAPHICAL USER INTERFACE FOR SYSTEM
100

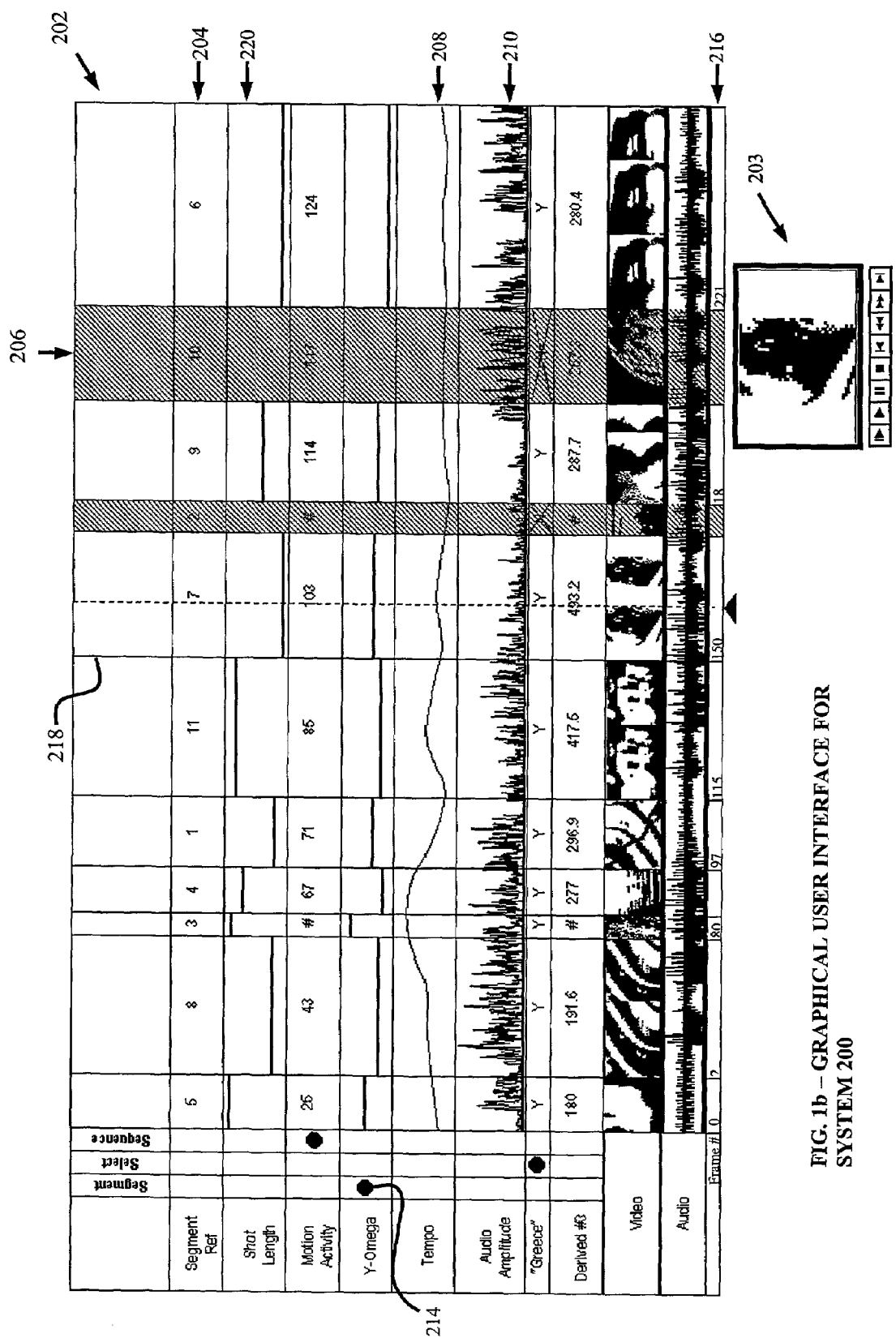
FIG. 1b – GRAPHICAL USER INTERFACE FOR SYSTEM 200

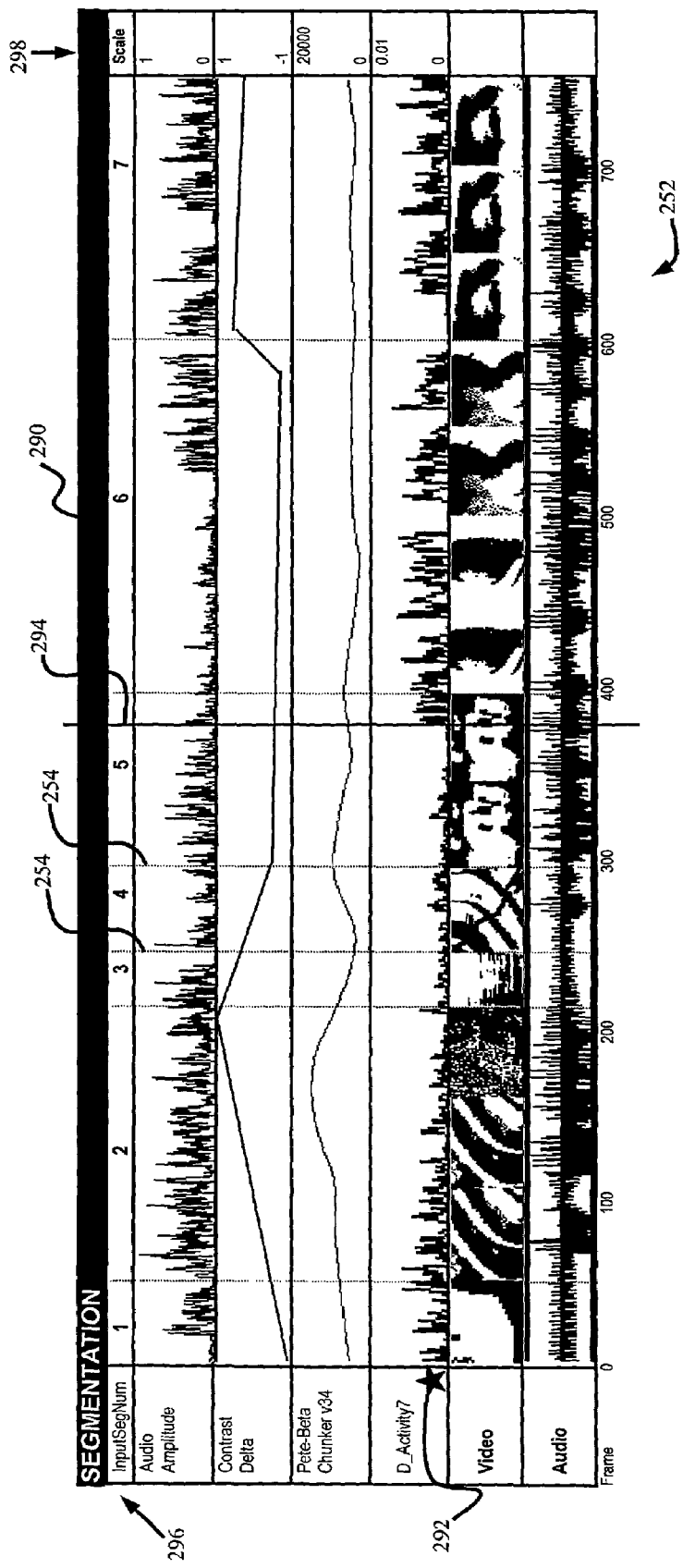
FIG. 2a – Segmentation Window (SegWin)

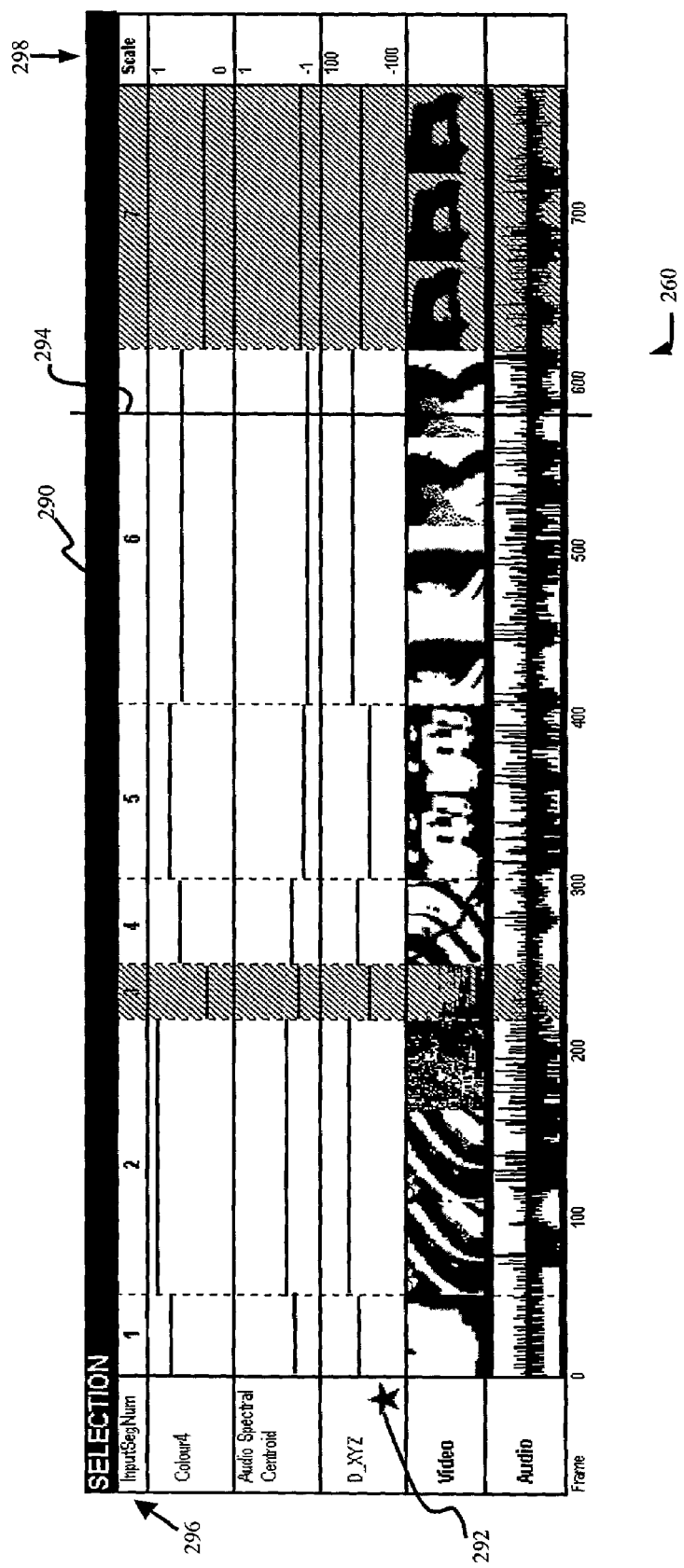
FIG. 2b – Selection Window (SelWin)

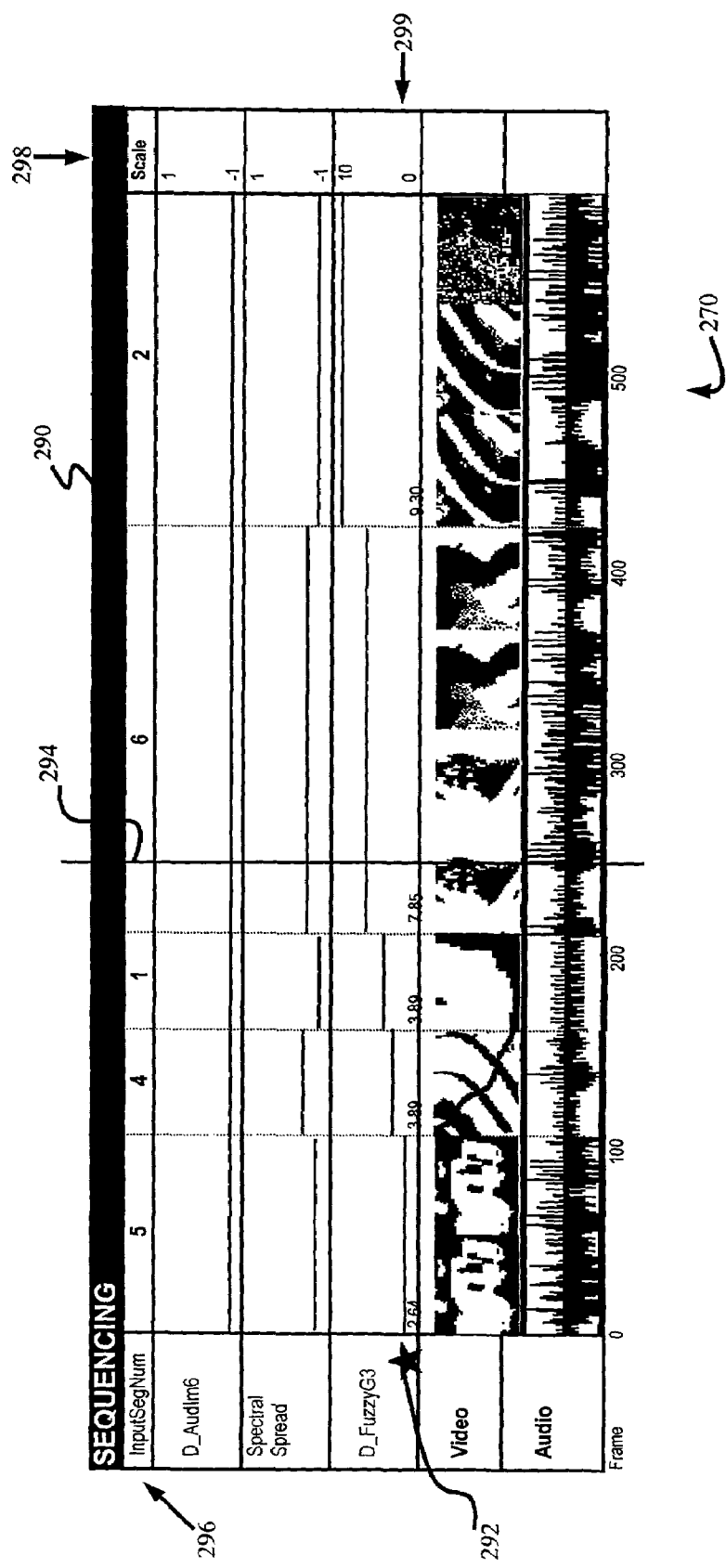
FIG. 2c – Sequencing Window (SeqWin)

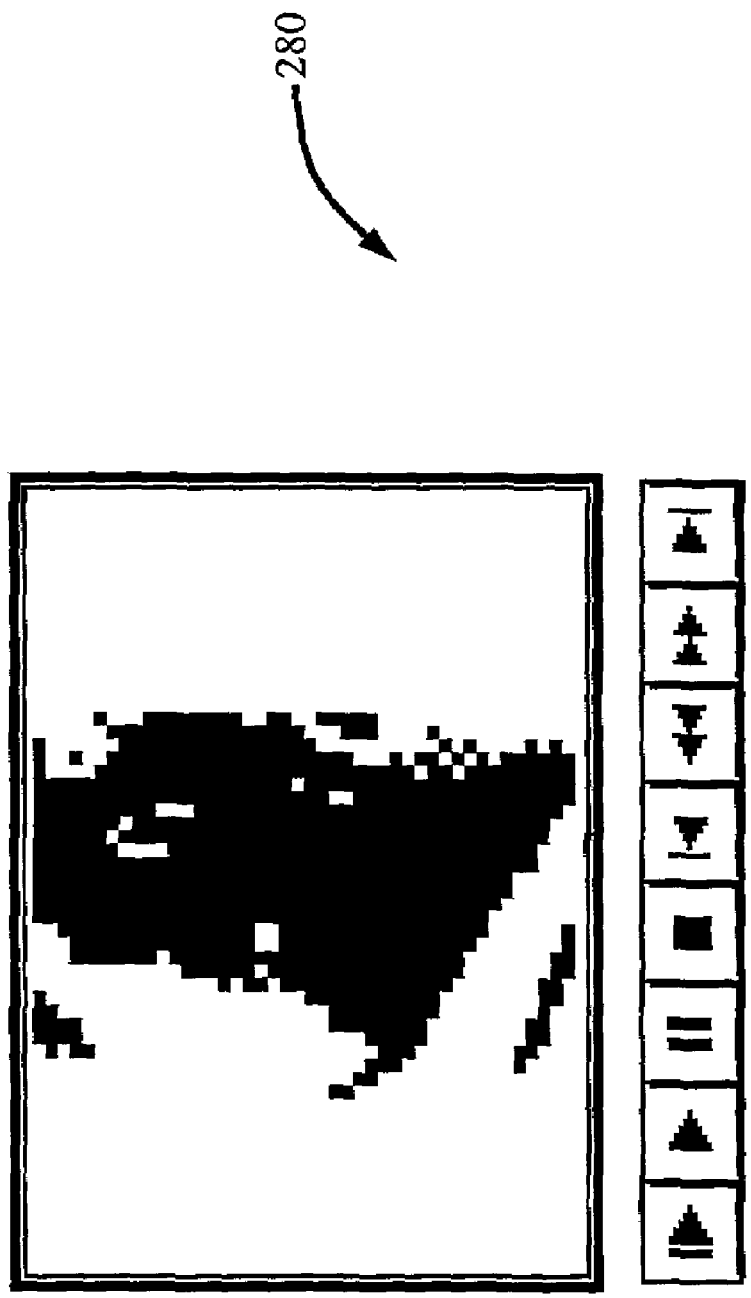
FIG. 2d – Monitor Window (MonWin)

SYSTEM AND METHOD FOR VIDEO PRODUCTION

FIELD OF INVENTION

The invention relates generally to video production. In particular, the invention relates to video re-purposing, editing and archiving for video production.

BACKGROUND

Today's non-linear video editors emerged from conventional editing methods such as film cutting and linear dub-editing using video players. These tools are well suited to scenarios where the desired result is a single, high-quality video production. It is not possible, however, to view multiple editing alternatives of a video production quickly using these tools, which is an impediment particularly to novice video editors. A video production novice therefore is forced either to "make do" with whatever the novice may create quickly or to spend a lot of time exploring alternatives.

A number of trends are creating a need for a radically different video production tool. One such trend is seen in the rapid growth of the amount of video material being shot or recorded, particularly video material shot by non-professionals. Technological developments or breakthroughs resulting in products such as Digital Video (DV) cameras mean that more and more video material are shot or recorded in digital format and of professional or near-professional technical quality. However, the cost of editing this type of video material using traditional tools is prohibitive in many cases.

Another trend is seen in the extension of the video material viewing paradigm beyond familiar broadcast and VCR paradigms. Viewers want increasing control over video material being watched, for how long, in what sequence, etc. This trend is particularly true for non-fiction video material in educational and professional environments. This trend also implies that there is a growing need to make bodies of video material available in multiple forms, for example, in video productions of different lengths, with different emphases, aimed at different audience demographics, etc.

Yet another trend is seen in the exponentially increasing availability of the amount of video material available in digital format and on the Internet. This trend drives a growing need for effective description of video material by using descriptors, so that video material appropriate to a particular purpose may be retrieved from a large body of available video material through the use of descriptors. There is great interest in the area of video material description today driving standardization efforts such as the Moving Pictures Experts Group's (MPEG) effort in relation to an MPEG-7 standard. However, a major challenge faces such efforts, and this challenge arises from two complementary facts. Firstly, descriptors automatically extracted from video material using signal analysis of the video material and therefore associated with such video material tend to lack semantic power because these descriptors are too low-level to be useful to and meaningful in the ordinary context so as to be understood by most users. Secondly, although semantically powerful descriptors may be associated with video material by being manually entered using a video production tool, this process is tedious and time-consuming and therefore the process may not be cost-effective in many applications.

Hence, there is clearly a need for a video production tool that addresses at least one of the foregoing trends.

SUMMARY

A video production system for facilitating the creation of descriptors for video material and use of the descriptors for automating a video production process is provided.

In accordance with a first aspect of the invention, a system for processing video segments is provided. The system includes means for creating a descriptor and ascribing at least one value thereto corresponding to a video segment. The system also includes means for assembling an output video production from at least two video segments, including means for selecting the at least two video segments according to values of at least one descriptor corresponding to the at least two video segments and means for sequencing the at least two video segments according to values of at least one descriptor corresponding to the at least two video segments.

In accordance with a second aspect of the invention, a method for processing video segments is provided. The method includes the step of creating a descriptor and ascribing at least one value thereto corresponding to a video segment. The method also includes the step of assembling an output video production from at least two video segments, the assembling step including the steps of selecting the at least two video segments according to values of at least one descriptor corresponding to the at least two video segments, and sequencing the at least two video segments according to values of at least one descriptor corresponding to the at least two video segments.

In accordance with a third aspect of the invention, a computer program product for processing video segments is provided. The product includes a computer usable medium having computer readable program code means embodied in the medium for processing video segments. The product has computer readable program code means for creating a descriptor and ascribing at least one value thereto corresponding to a video segment. The product also has computer readable program code means for assembling an output video production from at least two video segments, including computer readable program code means for selecting the at least two video segments according to values of at least one descriptor corresponding to the at least two video segments, and computer readable program code means for sequencing the at least two video segments according to values of at least one descriptor corresponding to the at least two video segments.

In accordance with a fourth aspect of the invention, a system for describing video segments is provided. The system includes means for creating a first descriptor and ascribing a first value thereto corresponding to a first video segment. The system also includes means for grouping said first video segment with at least one other video segment according to values of at least one other descriptor corresponding to said first video segment and said at least one other video segment. The system further includes means for ascribing said first value to said first descriptor corresponding to said at least one other video segment.

In accordance with a fifth aspect of the invention, a method for describing video segments is provided. The method includes the step of creating a first descriptor and ascribing a first value thereto corresponding to a first video segment. The method also includes the step of grouping the first video segment with at least one other video segment according to values of at least one other descriptor corresponding to the first video segment and the at least one other video segment.

The method further includes the step of ascribing the first value to the first descriptor corresponding to the at least one other video segment.

In accordance with a sixth aspect of the invention, a computer program product for describing video segments is provided. The product includes a computer usable medium having computer readable program code means embodied in the medium for describing video segments. The computer program product has computer readable program code means for creating a first descriptor and ascribing a first value thereto corresponding to a first video segment. The product also has computer readable program code means for grouping the first video segment with at least one other video segment according to values of at least one other descriptor corresponding to the first video segment and the at least one other video segment. The product further has computer readable program code means for ascribing the first value to the first descriptor corresponding to the at least one other video segment.

BRIEF DESCRIPTION OF DRAWINGS

Embodiments of the invention are described hereinafter with reference to the drawings, in which:

FIG. 1a illustrates a GUI of one variant of a video production system according to one embodiment of the invention;

FIG. 1b illustrates a GUI of another variant of a video production system according to another embodiment of the invention;

FIGS. 2a to 2d illustrate a GUI of a further variant of a video production system according to a further embodiment of the invention;

DETAILED DESCRIPTION

Figure 3:
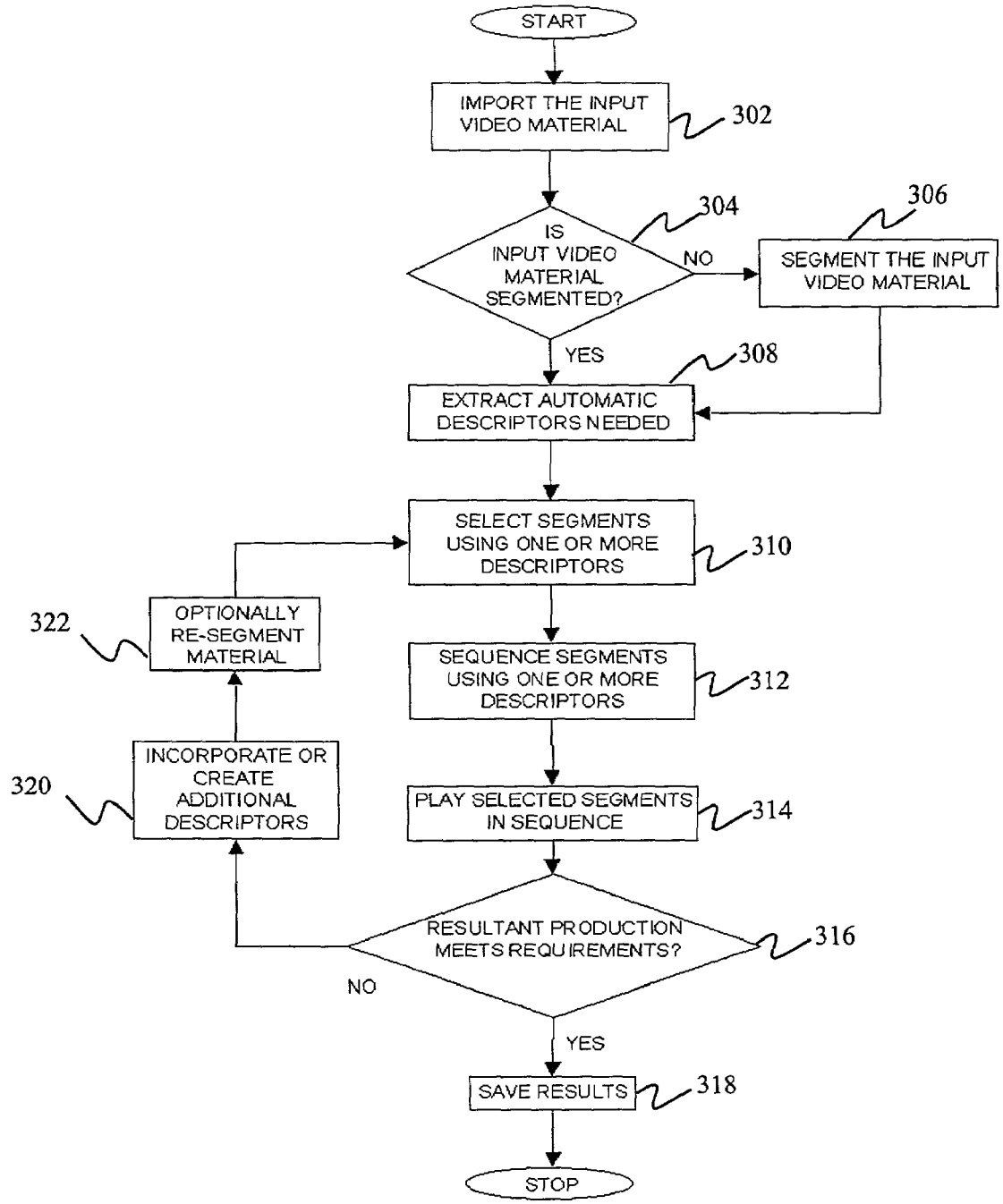
FIG. 3 is a flowchart illustrating a scenario on using a system according an embodiment of the invention.

A video production system for creating video productions from pre-existing video material, and descriptors for video material is disclosed. Such a video production system (hereinafter generally referred to as the system) addresses at least one of several trends and issues attendant thereon in relation to video production. Such trends include the growth of the amount of video material being shot, the extension of video material viewing paradigm, and the availability of the amount of video material available in digital format and on the Internet.

The system involves a display paradigm that preferably combines features of spreadsheets, graphing tools and non-linear video editors. The system also preferably enables video material to be segmented and re-concatenated in different combinations and sequences, during which, segments of video material are automatically and/or manually defined, selected and sequenced according to the value of descriptors.

The system may support a user who wishes to become familiar with a body of video material by viewing selected subsets of the body of video material in different sequences. Also, the system may support a user who wishes to explore different ways in which a body of video material may be combined to form video productions, for example, prior to a conventional video editing process. The system may further support a user who wishes to create video productions from a body of video material. Furthermore, the system may support a user who wishes to create descriptions of a body of video material to enable retrieval and re-purposing of the video material at a later time. Still further, the system may support a user who wishes to carry out other tasks related to video production and description.

The capability and effectiveness of the system depends on the way that the system allows a user try out many possibilities easily and quickly in a semi-automatic manner in video production work.

The system may be used as a tool for video re-purposing, editing or archiving in many video production scenarios. In one such scenario, a user may reuse video material from an existing video production to create a new video production. The process of reusing video material is known as "re-purposing". In another scenario, a user may utilize a body of video material to create several different, but related, video productions having, for example, different duration, different target audiences, etc. In a further scenario, a user may explore many possible sequences very quickly and create one or more "rough cuts" of video productions. In a yet further scenario, a user who is not a professional video editor may try out many possibilities or alternatives while creating a video production. By contrast, a professional video editor who is better able to pre-visualize the effect of editing generally does not need to try out too many alternatives. In a still further scenario, a user may create a video production very rapidly because time is more important than "polish".

The system may also be used in the creation of interactive video material. The system allows many "paths" through which the video material may be tested very rapidly. This is useful in creating video games that use branched video technology. Also, the system may be used for editing, re-purposing, or archiving other media, for example still images and audio.

Essentially, the system provides within a single framework a comprehensive set of video production tools and the ability to create a new video production. The set of tools are for defining and entering descriptors of several kinds in which existing descriptors assist in the creation of additional descriptors in an accelerating process. The new video production is created by selecting and sequencing segments of video material (and optionally re-segmenting the video material) according to the values of one or more of these descriptors, where the video material consist of both video and audio content.

The system also provides a graphical user interface (GUI) featuring a 2-dimensional (2D) grid where one axis relates to the segments of video material and the other axis relates to the descriptors. The 2D grid simultaneously shows a representation of the video content (e.g. by keyframes) and/or the audio content (e.g. by waveforms), and the values of multiple descriptors (e.g. as numbers or in graphical form). The GUI supports and inter-operates with the set of tools for describing and re-purposing the video material.

When given a body of video material (hereinafter generally known as the "input video material"), the system provides means for a user to essentially do two things. Firstly, the user is able to create a new video production (the "output video production") from the input video material. This is achieved by the processes of segmenting the input video material, selecting a subset of the segments, and sequencing the selected segments to form the output video production. The three processes of segmentation, selection and sequencing are performed by the system according to the values of descriptors, or performed manually by the user.

Segmentation may also be done extrinsically or outside the system. The user may alternate between automatic (i.e. descriptor-driven) and manual processing of the input video material with complete flexibility. The user may start with automatic processing to explore the broad possibilities of output video productions and then fine-tune the results manually. At any time during this process the user may watch all or part of the video production which results from the current selection and sequence of segments before settling on the final form of the output video production.

Secondly, the user is able to rapidly create semantically powerful descriptions or annotations of the video material. These descriptions allow later re-use of the video material, possibly by different users, and possibly in ways that may not be foreseen or contemplated by the user who created the annotations. For example, the annotations may be used to retrieve the video material from a video archive or used by an automated video constructor to create new video productions from the video material. As a result, many possibilities of output video productions may be tested rapidly, in this case the goal being to let the user explore the effect of different descriptions, and explore different ways of applying a given description, so that the user may optimize the annotations to the user's requirements.

The input video material may consist of previously edited material (such as one or more complete video productions originally created for a different purpose) or unedited raw video material which is being assembled for the first time, or any combination of the two.

The system provides such means by combining the functions described hereinafter.

Slicing of the Input Video Material into Segments

The system operates primarily on video "segments", which are contiguous pieces of the input video material of any temporal span. Automatic segmentation may be achieved using known techniques such as "shot boundary detection" or by other techniques such as detecting significant change in the value of one or more descriptors. Segmentation may also be performed or fine-tuned manually. Also, in some cases the input video material may consist of a set of separate segments which do not require further segmentation, or a mix of individual segments and video material which requires to be segmented. So segmentation is an important aspect of the system, but segmentation by the system is not necessarily implemented in all variants of the system.

Incorporation and Creation of Descriptors for the Segments

A descriptor is a piece of data or a data structure which describes some characteristic of a segment. Descriptors may be simple numeric values, vectors, matrices, multidimensional numeric entities, Boolean values, text strings and etc. Descriptors may originate in several ways including: importation of descriptors created at some earlier time, such as descriptors embedded in the video material; extraction of descriptors by signal analysis or other processing of the video/audio content; manual entry; and formulaic or algorithmic derivation from a set of one or more of the other descriptors. An important feature of the system is the provision of a framework in which additional descriptors may be specified and created easily by building upon existing descriptors. However, the system is not dependent on or restricted by the actual specifications of descriptors.

Automatic Segment Selection

The system allows a segment to be selected (i.e. included as part of the output video production) according to whether the value of one or more of its descriptors match certain criteria (e.g. fall into a certain range). This function allows the definition of different output video productions automatically by selecting different subsets of the segments of the input video material.

Automatic Segment Re-Sequencing

The system also allows segments to be sequenced (ie placed in an order which constitutes an output video production) according to the values of one or more of the segment's descriptors. For example, segments may be sequenced in the order of lower values to higher values, or in the order of distance from a given value. This function allows the definition of different output video productions automatically by sequencing segments of the input video material in different ways.

Automatic Construction of a New Video Production

At any time the user may view the output video production corresponding to the current set of selected segments in the current sequence. This is achieved, for example, by mouse-clicking a "Play" transport control in the GUI as shown in FIGS. 1 and 2. The user who wishes to view different output video productions may therefore simply reselect or re-sequence the video material according to a descriptor value and click the "Play" transport control. Such an operation in many cases involves just two mouse clicks for each output video production. Once the user has found an output video production form that meets the user's requirements (typically involving some manual adjustment as well as automatic segmentation, selection & sequencing), the user may export this form as a final output video production. In certain variants of the system this function may be supplemented by a transition generator which allows the insertion of video transitions (such as dissolves) and audio transitions (such as cross-fades) between segments; these transitions serve to make the output video production more visually and aurally pleasing.

Variants of the system in accordance with alternative embodiments of the invention and attendant operations are described using FIGS. 1 to 10.

Graphical User Interface (GUI)

FIGS. 1a, 1b, and 2 show the main elements of the display of three system variants according to three respective embodiments of the invention. The GUI of a first system 100 according to a first embodiment includes a Grid Window 102, a Monitor Window 104, and an Overview Window 106 as shown in FIG. 1a.

The Grid Window 102 is the main workspace for the first system 100. The Grid Window 102 shows the segments of the input video material (one per row 108) and the set of descriptors (one per column 110). In addition, a special column 112 is used to display video "thumbnails" which let the user see the current selection and sequencing of segments. This is supplemented by a second column 114 displaying a set of "audio thumbnails" which consist, for example, of a waveform display of part of the audio of the segment. Each cell 116 of the descriptor columns 110 shows the value of one descriptor for one segment.

The user does four main things when using the Grid Window 102. Firstly, the user defines descriptors by adding columns 110. The descriptors may be of any of the four types described hereinbefore. A column 110 is therefore defined to allow any of the possibilities: import and display the values of a descriptor created at some earlier time; calculate and display the values of descriptors extracted by signal analysis or other processing of the video/audio content; allow entry and display of the values of a manual descriptor; and calculate and display the values of a descriptor derived from other descriptors by a formula or algorithm. In the first system 100, the user interface mechanism for defining the purpose of a column 110 is one or more dialog boxes which appear when the user mouse-clicks on the column header.

Secondly, in the case of manual descriptors, the user enters values manually into the cells 116 of the Grid Window 102 and propagates the descriptors to related segments.

Thirdly, the user applies segment selection rules by which segments are included or excluded from the output video production according to the value of one or more descriptors. This is illustrated in column 9 (the "Information Content" descriptor) where a segment 118 is excluded because the value of the segment 118 in respect of such a descriptor falls below a certain threshold, while all other segments are selected. The user interface mechanism for performing this operation consists, for example, of a single mouse-click in the cell of the "Select" row 120 for a particular descriptor which then results in making such a descriptor the one, or one of several, controlling selection. The specification of the selection rules, for example the threshold value, and the way that this descriptor should logically combine with other descriptors when several descriptors are used together in the selection process, is controlled through a user interface mechanism such as one or more dialog boxes which pop up when the user right-clicks in the same cell.

Fourthly, the user re-sequences the segments according to the value of a descriptor. This is done using a simple sort-by-value (eg from lowest to highest value as shown in column 6 of FIG. 1a) or a sort-by-distance. In the first system 100, the user interface mechanisms are very similar to those described for segment selection.

The Monitor Window 104 is used for viewing the output video production resulting from the current selection and sequence of segments. The transport controls 122 of the Monitor Window 104 allow a standard set of functions to be used: play from beginning; play from current point; pause; stop; go forward by one frame; reverse by one frame; fast forward; and fast rewind. In other system variants, additional transport and browsing controls known to those skilled in the art may be incorporated—for example a "scrub" control.

The Overview Window 106 uses one keyframe per segment to provide an overview of the output video production resulting from the current selection and sequence of segments. System variants may use motion icons (micons) which replay the segments in a looped mode and such techniques are well known to those skilled in the art.

The elements of the three windows of the display interoperate closely to provide alternative views of the video material. For example, a segment which is filtered out by the current selection settings is grayed out in the Grid Window 102 and therefore does not appear in the Overview Window 106. As another example, the current position in the output video production is indicated in all three windows by a small triangle 124 in the Grid Window 102 and the Overview Window 106, and by the presence of a certain frame 126 in the Monitor Window 104. When the user clicks the Play control 122, the output video production is shown in the Monitor Window 104. At the same time, the small triangle 124 moves down the right side of the Grid Window 102 and along the top of the Overview Window 106 to show the current location of the played video material.

In addition to using descriptors to select and sequence segments, the user is able to manipulate individual segments directly in both the Grid Window 102 and the Overview Window 106. The first system 100 allows the user to perform standard operations such as deletion, insertion and re-sequencing (e.g. by drag & drop) directly on one or more segments. Again, the three windows 102, 104 and 106 interoperate closely so that a change executed in one window is immediately reflected in the other windows.

The GUI of a second system 200 according to a second embodiment of the invention is shown in FIG. 1b, which differs in a many ways from the GUI of the first system 100. One such difference is the use of only a Grid Window 202 and a Monitor Window 203 in the GUI of the second system 200. Another difference is the interchange of the X and Y axes between the Grid Window 202, where descriptors form rows 204 and segments form columns 206, and the Grid Window 102 in FIG. 1a. The X-axis is a time axis, in which a unit of distance represents a unit of time. Thus, in FIG. 1b, segments of different duration result in columns 206 of different widths, whereas in FIG. 1a segments are allocated equal space regardless of duration. Some descriptor values are represented by graphs. Also, some of the descriptors are represented in time-series (i.e. sets of values at different points in time, typically at equal time intervals) with many consecutive values for a single segment. For example, the "Tempo" descriptor 208 and "Audio Amplitude" descriptor 210 are represented in time-series and have many values per segment. In contrast, each of the descriptors in the Grid Window 102 shown in FIG. 1a contains a single value per segment.

In the Grid Window 202, there is a facility to re-segment the material according to descriptor values represented by a "Segment" column 212. In this example, "Y-Omega" is set as the descriptor controlling segmentation (the small circle 214 in the "Segment" column 212 indicates this) and specifically the material is being segmented on changes in the value of Y-Omega. The user interface mechanism for performing this kind of dynamic segmentation consists of a left-click in the "Segment" column 212 to make a certain descriptor control segmentation, and a right-click in the same place to open a dialogue box for specifying the segmentation rules (change in value, minimum segment length, etc).

In the Grid Window 202, where space allows, the video content is represented by more than one keyframe per segment. Also, the audio content is represented as a continuous waveform rather than a series of audio thumbnails. Additionally, the last row 216 shows the start frame number of each segment in the output video production.

The Overview Window 106 shown in FIG. 1a is omitted from the GUI of the second system 200. Such a facility is not as important when the video is represented in the Grid Window 202 as a set of keyframes in a horizontal direction where there are multiple keyframes per segment.

In a third system (not shown in any figure) according to a third embodiment of the invention, the GUI of the second system 200 is supplemented by additional user-interface elements well known to those skilled in the art. These elements are derived from several types of software application, for example menus, scrollbars, and other elements typically used in Window-based display systems. Also, elements such as time-code displays, pop-up windows for playing and trimming the in/out points of individual segments, horizontal and vertical zooming, and other elements typically used in non-linear video editors are used. Additionally, elements for manipulating the rows and columns such as inserting, removing, duplicating, splitting, cutting & pasting, and other elements typically used in spreadsheets and other programs using a grid-like or table-like interface are used.

In a fourth system (also not shown in any figure) according to a fourth embodiment of the invention, the user is allowed to flip quickly between several instances of the display, each display shown with a set of data. This is supported either by allowing multiple instances of, for example, a program in relation to the fourth system to run simultaneously, or by allowing multiple Grid, Monitor, and Overview Windows 102, 104, 106 shown in FIG. 1*a* to be accessible within a single instance of the program. In such cases data is transferred between instances in standard ways such as cutting and pasting. These ways of transferring data are all standard features of application programs well known to those skilled in the art.

Using the System

A system according to an embodiment of the invention described herein has a number of functions which a user may generally use in any sequence. However, there are typical sequences of steps which a user employs in most cases. A typical simple scenario is illustrated in the flowchart of FIG. 3. The user initially imports into the system some video material (the "input video material") in a step 302. If the input video material is not already segmented as tested in a step 304, the user directs the system to segment the input video material in a step 306, for example into visual shots, or segments corresponding to some aspect of the audio information. The user directs the system to extract descriptors automatically using some signal analysis functions provided by (or otherwise accessible from) the system in a step 308. The user then directs the system to use the value of one or more of these descriptors to select a number of the segments of the input video material and filter out the rest in a step 310. For example, the user may filter out all segments of the input video material which have a speech likelihood measure less than 0.6, or filter out all segments whose overall brightness is more than 20% different from a selected segment.

Subsequently, the user directs the system to use the value of one or more descriptors to sequence the segments in a step 312. For example, the user may use the peak amplitude of the audio content of segments to order the segments from loudest to quietest. The user then directs the system to play the selected segments in the sequence resulting from the previous step in a step 314 so that a new output video production created from the input video material is played. The user views/auditions the result to see if the new output video production meets the user's requirements.

If the user likes the result as tested in a step 316, the user may direct the system to export the result as a new video file in a step 318 and the user's work is finished. However, in most cases the result typically does not meet the user's requirements so quickly. The user therefore enters an iterative process of incorporating and creating additional descriptors in a step 320, possibly re-segmenting all or part of the video material in a step 322, selecting/sequencing the segments based on the new descriptor values, viewing the results, cycling back to incorporate or define yet more descriptors, and so on. The additional descriptors may be of any of the types described hereinbefore.

Many of the steps described in relation to FIG. 3 are performed automatically by the system, requiring merely a few simple user operations (e.g. mouse clicks) per step.

At any point in this process the user may also select and sequence segments manually, for example by "dragging and dropping" individual segments in the Grid Window 102 or 202 or the Overview Window 106. It is also possible to re-segment material manually—i.e. to adjust the "in" and "out" points of segments directly. Typically, manual operations are used to fine-tune results after the process of selection and sequencing by descriptor value has produced a "rough-cut" of the output video production.

At any point in this process, the user may freeze sections of the output video production which the user does not want to alter while working on other sections. For example, some segment boundaries may be frozen while re-segmentation is applied. Freezing may also be applied to both selection and sequencing. The segment selection status of some or all segments may be frozen, and so may any number of segment sub-sequences of any length. This freezing step is not shown in FIG. 3, but a frozen state may be displayed to the user by a mechanism such as using a particular color to shade the segments in the Grid Window 102 or 202. For example, the rows 108 in FIG. 1*a* or columns 206 in FIG. 1*b* may be shaded with an appropriate color.

Descriptors

The processes involved in introducing, defining and making use of descriptors are important to the system. The types of descriptors described hereinbefore may be classified into four types according to their origin.

Imported Descriptors

The system may import descriptors created at some earlier time which are embedded in, or in some way linked to, the video material. These descriptors include segments of text script which are linked to segments of the video where these may act as keyword descriptors. Such descriptors also include descriptors generated by camera instrumentation such as time-of-shooting, focal distance, geographical location generated by satellite positioning systems (eg GPS) attached to the camera, etc. Also, the descriptors may include descriptors saved from an earlier session using the system. In some cases these descriptors may require interpretation or conversion as part of the importation process. For example, it may be desirable to filter a script in order to turn the significant keywords into descriptors and discard the connecting words such as prepositions and conjunctions. The system may be supplied with a set of such import processing modules.

Extracted Descriptors

Descriptors may be extracted from the input video material by applying signal analysis techniques or other kinds of processing to the video or audio content of the input video material. Typical examples are color histograms, audio spectrograms, aural intensity measures, object boundaries, motion vectors, categorical likelihood measures (e.g. probability that the audio content of segment X is speech), etc. Many such descriptors are well known to those skilled in the art and new ones are constantly being defined.

Such automatically-extracted descriptors are generally "low-level", meaning that the descriptors represent statistics and other general properties of the signals, but not the kind of "high-level" semantic information which a user is likely to be most interested in. Even where such descriptors are further analyzed in order to extract high-level semantic information, the results are generally not reliable. For example, the user may wish to identify from the input video material all shots of Bill Clinton, or all shots of crowds waving, but an automatic "Bill Clinton Detector" is currently beyond the state of the art. Even a "People Waving Detector" may in general be quite unreliable, meaning that such a detector may either miss a high percentage of shots of people waving or give a high percentage of false positives (e.g. perhaps of trees waving in the wind.)

The system is designed to exploit signal analysis descriptors to the fullest, but it is not limited to, or dependent upon, any specific signal processing algorithm. Firstly, the system allows the user to "see at a glance" the result of filtering and/or re-sequencing the input video material according to the descriptor value. Secondly, the system combines multiple descriptors of this kind in order to achieve more reliable extraction of semantic information. Thus the system is a framework capable of incorporating any signal analysis descriptor which may be implemented as a software module (i.e. a set of instructions), a hardware module, or a firmware module. In the process of applying signal analysis description, the system produces a data element or set of elements for each segment of the input video material, where a data element may be a single number, a vector, an array, a Boolean value, a character string, a structure, or an entity of any other data type.

Signal analysis descriptors may be created by writing these descriptors as plug-ins for the system architecture, and additional plug-in descriptors may be added to the system at any time. The user may employ any of these descriptors at any time by, for example, clicking on the header of a row in the Grid Window 202 in FIG. 1b and selecting a descriptor from a drop-down list of all available descriptors.

In addition to descriptor extraction by signal analysis, certain simple but powerful descriptors may be extracted directly from the input video material and the organization of the input video material. One such instance is when the duration of segments may be used as a descriptor. Another instance is when the sequence of segments in the input video material may be converted into an ordinal descriptor (i.e. 1st, 2nd, 3rd . . . nth).

A further instance is when each segment has a selection state that is a Boolean value, i.e. where a segment is either selected or not selected. At any time the set of selection states for all segments may be converted into a descriptor. Any number of such selection state descriptors may be created, allowing the user to return to an earlier set of selections at a later time.

A still further instance is when the current segment sequence may be converted to an ordinal descriptor at any time and any number of such sequence descriptors may be created. The combination of a set of selection descriptors for all segments and a set of sequence descriptors for all segments fully defines the form of an output video production in all cases except where the video material has been re-segmented. Thus, once such a pair of descriptors has been created, the user may at any later time quickly return to the version of the output video production defined by the pair of descriptors. This allows the user to explore many possibilities which may be radically different from each other without discarding earlier versions (especially important when these versions include manual processing) and to compare different versions against each other by playing them with minimal delay in between.

A yet further instance is when a process of manual sequencing followed by the creation of a sequence descriptor may be used to create semantic descriptors. For example the user may drag & drop segments in a sequence according to how "happy" they are, i.e. from "happiest" to "saddest". If the user then creates a sequence descriptor, the descriptor becomes, in effect, a "happiness" descriptor (something which could not be extracted by a fully automatic process in most cases). Such a descriptor actually provides a set of values representing "happiness order" which is not a true "happiness" descriptor in the full sense, but for many purposes such a descriptor is quite adequate.

Manual Descriptors

These are descriptors which the user is unable or does not want to create by automatic means and which therefore have to be entered manually into the system. This kind of descriptor includes many semantic descriptors (e.g. the descriptor indicating the presence of "George" in FIG. 1a) and textual descriptors (e.g. the descriptor indicating location in FIG. 1a). The system supports entry for this kind of descriptor by allowing any number and type of manual descriptors to be added—for example by inserting new rows in the Grid Window 202 of FIG. 1b.

The system importantly supports rapid propagation of descriptor values to related segments. Rapid propagation refers to a process where after one or more manual descriptors have been assigned values for a single segment, these values may be duplicated very quickly to a related set of segments as shown in the flowchart in FIGS. 4a and 4b. This process is important when there are a large number of segments (by way of indication, a typical movie will have over 1000 shots), and even more so if a large number of manual descriptors are involved.

The main mechanism that the system uses to support rapid propagation is re-sequencing. The mechanism is used to bring related segments close to each other in the display (e.g. in the Grid Window 202 of FIG. 1b, to cluster together columns which are related) so that the value(s) of manual descriptor(s) may be copied easily to these related segments.

In a typical case, an automatic descriptor is used to sort the segments, so that the new manual descriptor(s) may then be copied rapidly to segments which lie nearby in the display. In a variant of this mechanism, the system may be directed to propagate one or more manual descriptors to all segments for which the value of a certain automatic descriptor lies within a certain range.

Figure 4A:
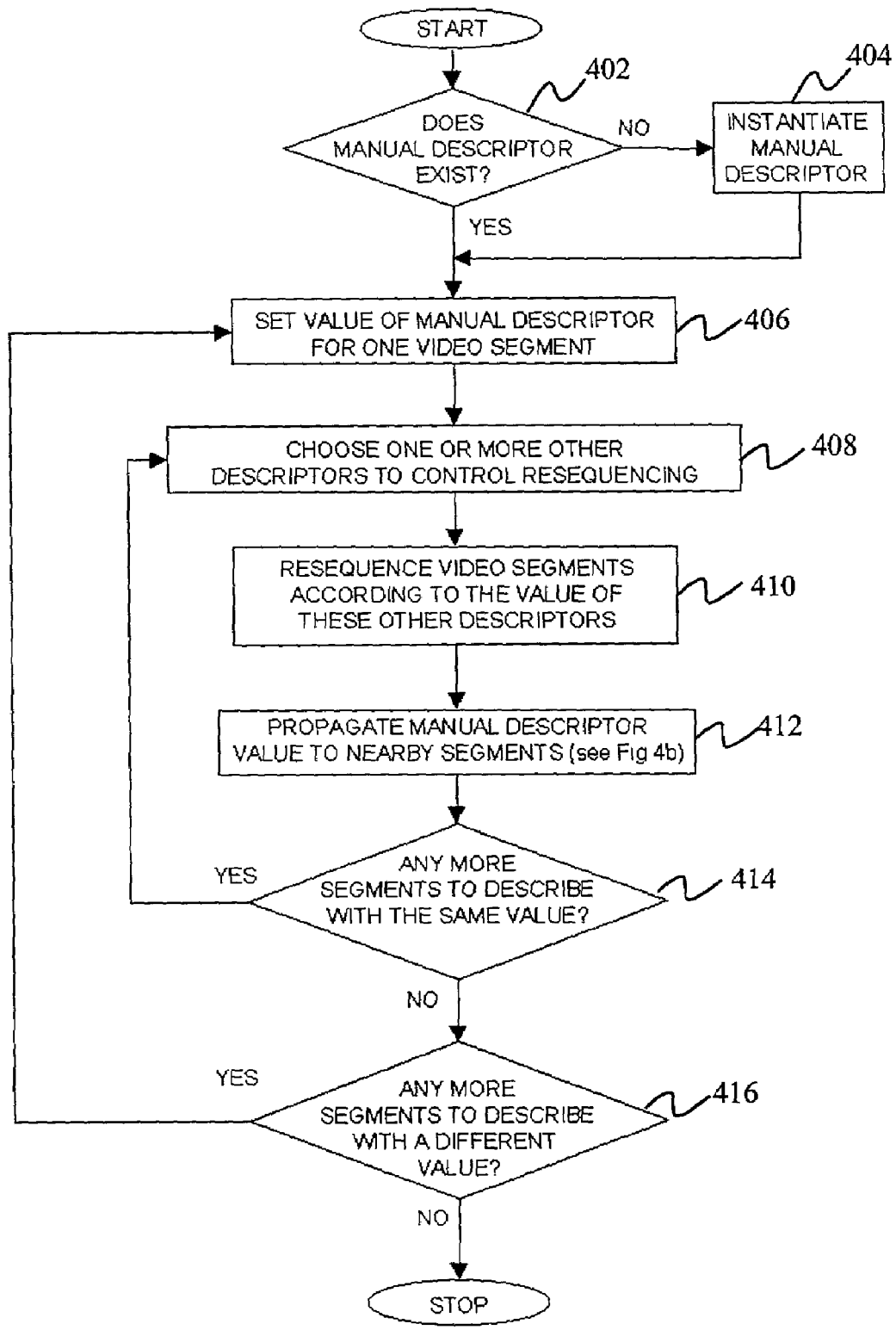
FIG. 4a is a flowchart illustrating a process for rapid propagation of manual descriptors in the system in FIG. 2.

With reference to FIG. 4a, steps involved in a rapid propagation process are described. If the manual descriptor does not exist (e.g. does not appear as a row in FIG. 1b) as tested in a step 402, the user instantiates the descriptor in a step 404. Regardless, the user assigns a value to the manual descriptor for one segment (the source segment) in a step 406. The user then chooses one or more other descriptors to control resequencing in a step 408. The user typically chooses descriptor(s) which the user believes have some correlation with the manual descriptor the user wishes to propagate. The user then instructs the system to resequence all the segments, or some subset of the segments, using the value of the other descriptor(s) in a step 410. The purpose is to bring similar segments near to the source segment so as to order the segments according to their differences (in terms of one or more descriptors) from the source segment.

The user subsequently selects one or more of the segments which lie nearby the source segment and instructs the system to duplicate the value of the manual descriptor of the source segment to these nearby segments in a step 412.

If there are remaining segments which need to be assigned the value of the source segment but which do not lie nearby as tested in a step 414 because the resequencing operation in step 408 does not evaluate these segments as similar to the source segment, the user may return to step 408 to choose different descriptor(s) to control resequencing.

If there are segments which require to be assigned a different manual descriptor value as tested in a step 416, the user may return to step 406.

Figure 4B:
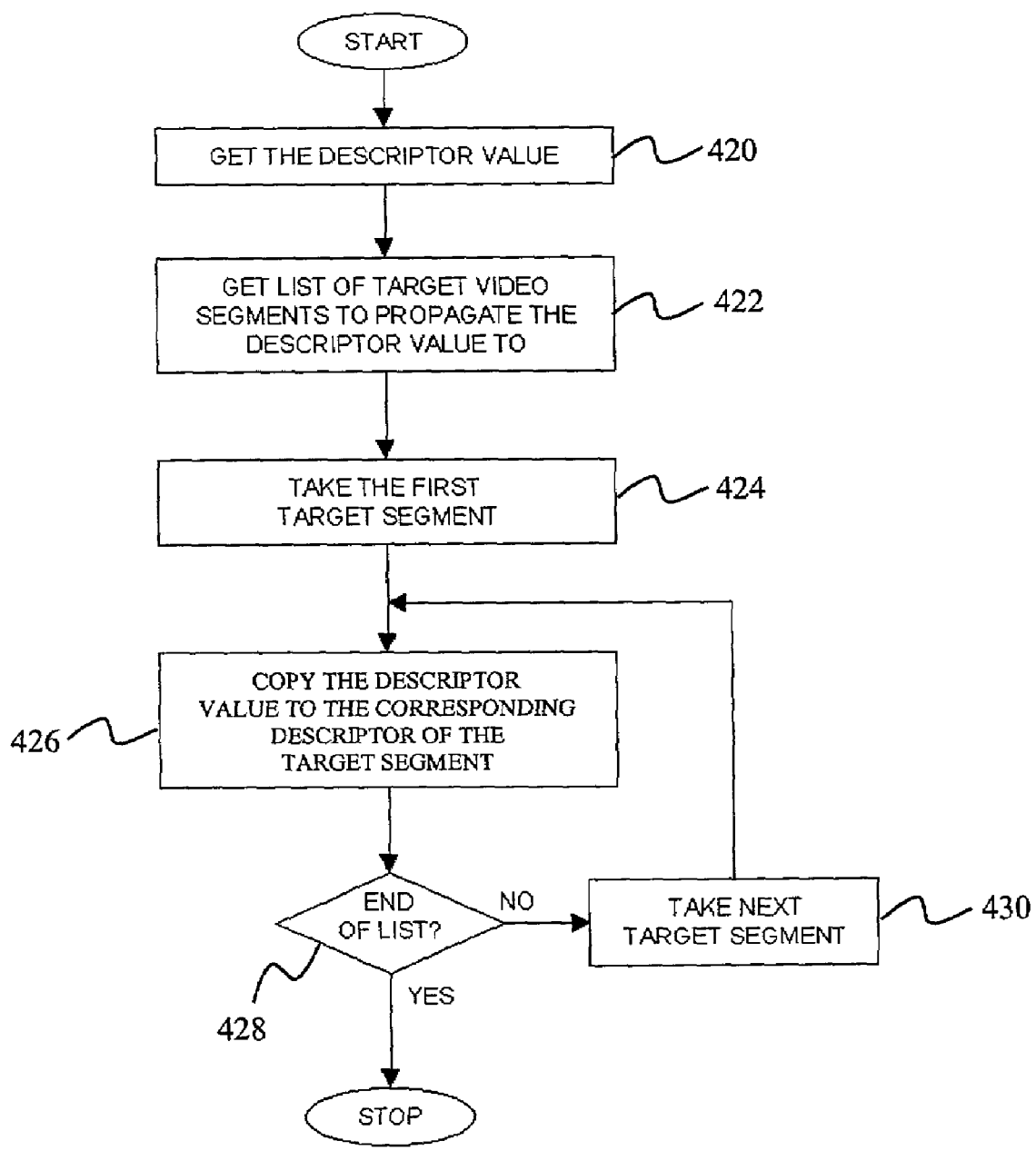
FIG. 4b is a flowchart illustrating a process for propagating a descriptor value to segments in the system in FIG. 3.
Figure 5:
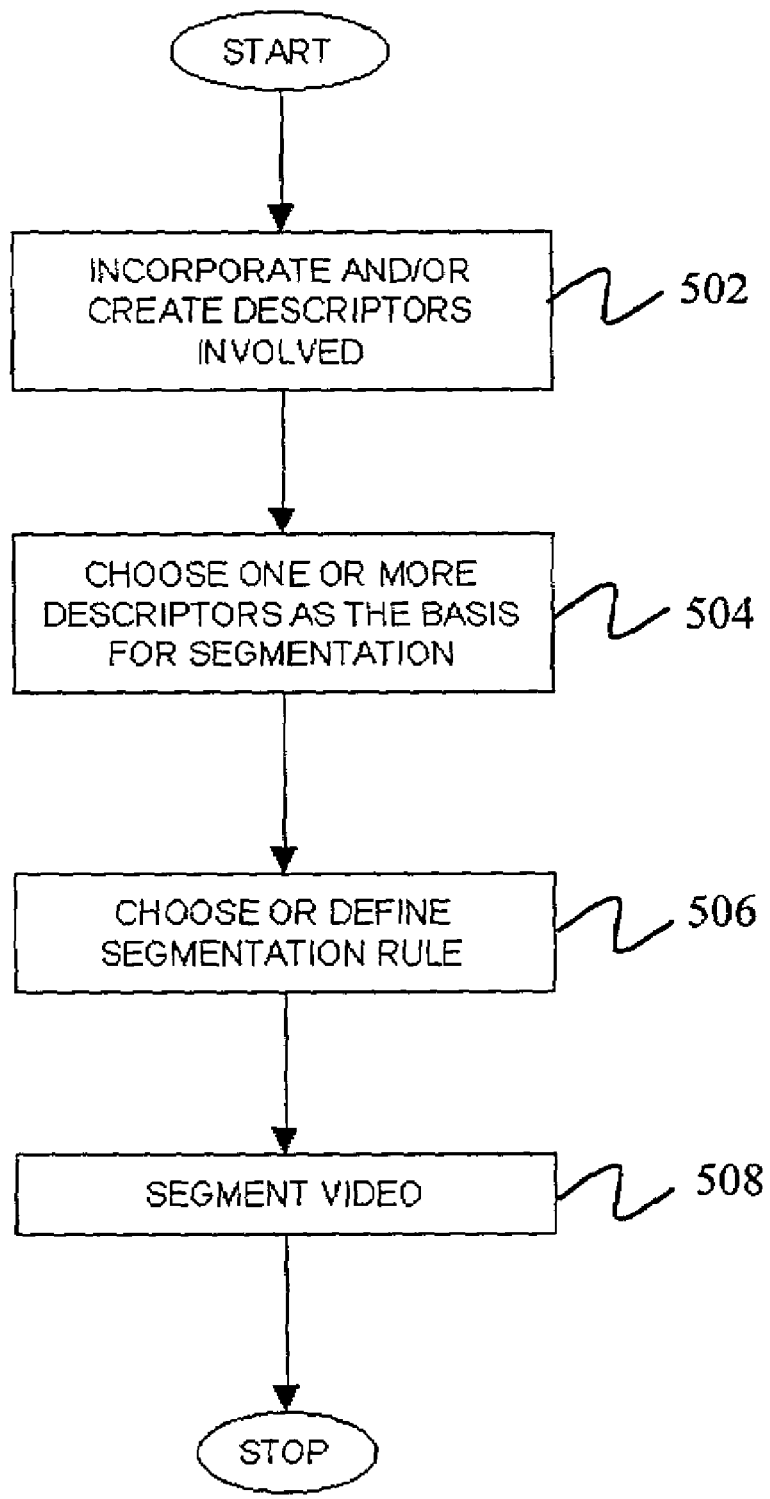
FIG. 5 is a flowchart illustrating a process for automatic segmentation in the system in FIG. 2.

With reference to FIG. 4b, the operation within step 412 is further described in relation to the propagation of the value of the manual descriptor of the source segment to nearby segments. The value of the manual descriptor is retrieved in a step 420. Then a list of the nearby or neighbour target segments to which the value of the manual descriptor is to be propagated is obtained in a step 422. The first target segment on the list is selected in a step 424. The value of the manual descriptor for the source segment is copied to this target segment in a step 426. A test is done as to whether the end of the list is reached in a step 428. If not, the next target segment on the list is selected in a step 430 and the system returns to step 426.

Such a rapid propagation process is useful even in cases where automatic descriptors are only loosely correlated with the characteristic the user wants to label with a manual descriptor. Any ordering which tends to bring similar segments together is useful when entering manual descriptors, even if this tendency is quite weak. As an example, the user may label a certain segment with four descriptors "city street", "winter", "sunny" and "crowd waving", and then wish to propagate this description, or parts of it, to other segments. To achieve this, the user might order the segments according to an automatically extracted color descriptor (e.g. color contrast in this case, because sunny, snowy street images generally have very high contrast) and an automatically extracted motion descriptor (e.g. many small areas of uncorrelated movement which might indicate waving arms). The user's hope is that the resultant clustering groups together a reasonably high percentage of segments for which some or all of the labels "city street", "winter", "sunny" and "crowd waving" may be applied. Despite the severe limitations of today's automatically-extracted descriptors, there are many cases where this process works well enough to make the work of manual descriptor entry substantially easier, providing a first approximation which, if necessary, the user may then refine by editing the descriptors of individual segments.

This type of mechanism is particularly effective when segments are ordered according to the differences between the segments and a given example segment. The difference may be defined, for example, by the Euclidean distance from a given segment in the n-dimensional descriptor space.

Derived Descriptors

The system also importantly supports the creation of new descriptors by defining these descriptors as combinations of existing descriptors. The method of combination may be formulaic, in which a new descriptor is defined as a formula containing one or more other descriptors as variables. The method of combination may also be algorithmic, in which the new descriptor is defined as a set of instructions which describe how it is to be derived from one or more other descriptors.

For example, in the "sunny winter street with waving crowd" scene described hereinbefore, a new descriptor, X, may be defined as the weighted sum of a color contrast descriptor and a particular motion descriptor. Typically the user creates X by clicking on the header of a row in the Grid Window 202 shown in FIG. 1b and entering the required formula in a dialog box. Once the user has defined the descriptor and closed the associated dialog box, the system automatically calculates the value of this new descriptor for all segments of the video and fills in cells of the row with the updated values. The user may then instruct the system to filter or sort on the value of this new descriptor.

As an alternative to personally entering the formula, the user may select a formula from a predefined set of formulae and algorithms in the same manner that signal analysis descriptors may be selected from a list as described hereinbefore. The system provides a set of the most standard and useful formulae and algorithms for descriptor derivation.

It is typical that at this point the user finds the new descriptor inadequate. The descriptor X may, for example, give the same range of values for scenes of reeds waving in the wind against a snowy background as for the desired crowd scenes. But the user may then realize that there is a substantial difference in the audio levels of the crowd scenes (probably loud) versus the waving reeds (probably quiet) and make use of this fact by creating another descriptor Y which combines descriptor X with an audio loudness descriptor L. The combination could be formulaic (e.g. Y=L*X), but alternatively Y may be a string derived from an algorithmic process such as:

if ((L>−15) and (X>1000))
    Y="crowd waving in winter street";
else
    Y=" ";

Thus, by building descriptors out of combinations of other descriptors potentially in complex hierarchies where descriptors are derived from other descriptors which in turn are of the derived type, the user is often able to arrive at descriptors which correlate quite well with semantic elements of the input video material. These descriptors may then be used to select and sequence segments of the video, or to provide new descriptions which label the video content for future use. For example, the descriptor "crowd waving in winter street" may be useful in a video archiving application. Like all automatically derived descriptors, these derived descriptors seldom provide a complete and totally accurate semantic description. However, these derived descriptors at least provide useful ways for the user to explore different arrangements of the video material or a quickly produced approximation to an end result which the user may then refine.

Segmentation

Segmentation is an important aspect of the system that involves several issues. In the system, segments span temporally from any time X to any later time Y in a piece of input video material. Segments may exist in any length from a single frame to the full length of a piece of input video material. Typically segments are semantic units derived from segmentation based on visual information such as shots, scenes, etc, or aural information such as sentences or paragraphs of a voice-over narration. Segments may overlap each other in any way, so that parts of the input video material may belong to more than one segment, though to avoid such overlaps is often desirable.

Segmentation may be performed outside the system, or within the system, or both. Segmentation of video material performed extrinsically is done before using the system to process those video material. In other words, the input video material may be pre-segmented and then imported into the system. In contrast, segmentation performed intrinsically may be done dynamically, i.e., the input video material may, if desired, be re-segmented at any time during the operation of the system.

Automatic Segmentation

There are many automated techniques for segmenting video material, any of which may be applied extrinsically or intrinsically. A common technique, well known to those skilled in the art, is Shot Boundary Detection. Segmentation may also be done using audio information, for example, by creating a new segment each time the average audio amplitude drops below a threshold, or by identifying speech versus music, or by recognizing probable changes in speaker.

In the system, any automatic segmentation performed intrinsically is treated as an operation on one or more time-series descriptors. In such cases, the process involved in defining a segmentation operation is shown as a flowchart in FIG. 5.

The descriptors are firstly incorporated and/or created in a step 502 where the descriptors may be imported, extracted, manually entered, or derived using any of the ways described hereinbefore. Thereafter, the user chooses which one or more of the available descriptors is to be used as the basis for the segmentation in a step 504. This step is controllable by the user through the GUI described with reference to FIG. 1b.

The user then defines the segmentation rules or chooses from a set of segmentation rules provided by the system in a step 506. These are formulaic or procedural rules which govern the derivation of segment in and out points, i.e. time references of the start and end of segments, from the chosen descriptors. One common type of rule for a single descriptor is threshold-crossing, either of a descriptor or of one of the time derivatives of the descriptor. In many cases the application of this rule needs to be supplemented with rules governing the amount and duration by which a threshold must be crossed in order to count as a significant event. In the case where segmentation is based upon multiple descriptors, the rules include the mutual interaction of the descriptors, for example where the overall segmentation rule is a function of Boolean AND, OR & NOT operators superimposed on the rules for individual descriptors. The chosen or defined segmentation rules are then applied for segmenting the video material in a step 508.

As an example of automatic segmentation, an audio amplitude descriptor may be created and the segmentation rules defined such that a new segment is created each time the audio amplitude drops below a certain threshold value for a certain minimum time, and then crosses back above the threshold. Another example would be to define a set of color histograms, motion vectors and other visual descriptors, combine these descriptors in some formula to produce a new descriptor X, then segment the video material according to the rule that a new segment is created each time the second derivative of X exceeds a threshold.

In the system, automatic segmentation may be implemented using not only scalar descriptors, but also more complex descriptors such as vectors, matrices and strings.

Re-Segmentation

In most cases, segmentation is done in the early stages of processing the input video material. Once the user has moved on to other kinds of processing such as selecting and sequencing, creating manual descriptors, reducing time-series descriptors to single-value-per-segment (described in more details hereinafter), the user usually makes only minor changes in segmentation. This is because major re-segmentation, notably automatic segmentation, tends to corrupt the selection/sequence/descriptor structure created. Nevertheless it is sometimes necessary to do major re-segmentation later in the process, so the system also provides support for re-segmentation. In providing support for re-segmentation, two groups of issues involved are considered.

The first group of issues concerns which organization of the video material a re-segmentation operation should apply to in a scenario where the video material has been re-organized by earlier selection and sequencing actions. In general, segmentation and re-segmentation are processes which the user wishes to apply to the input video material (i.e. the segments in their original sequence or flow), not to the output video production.

An example is a scenario in which the user has been working for a time and has created a selection/sequence of segments which comprise an output video production. Subsequently the user decides to re-segment the video material, for example, because the user wishes to try segmenting the video material based on an audio characteristic rather than on a shot basis. In fact, what the user wants to do in this case is to re-segment the input video material in its original sequence, but without losing the selection/sequence comprising the current output video production.

Figure 6:
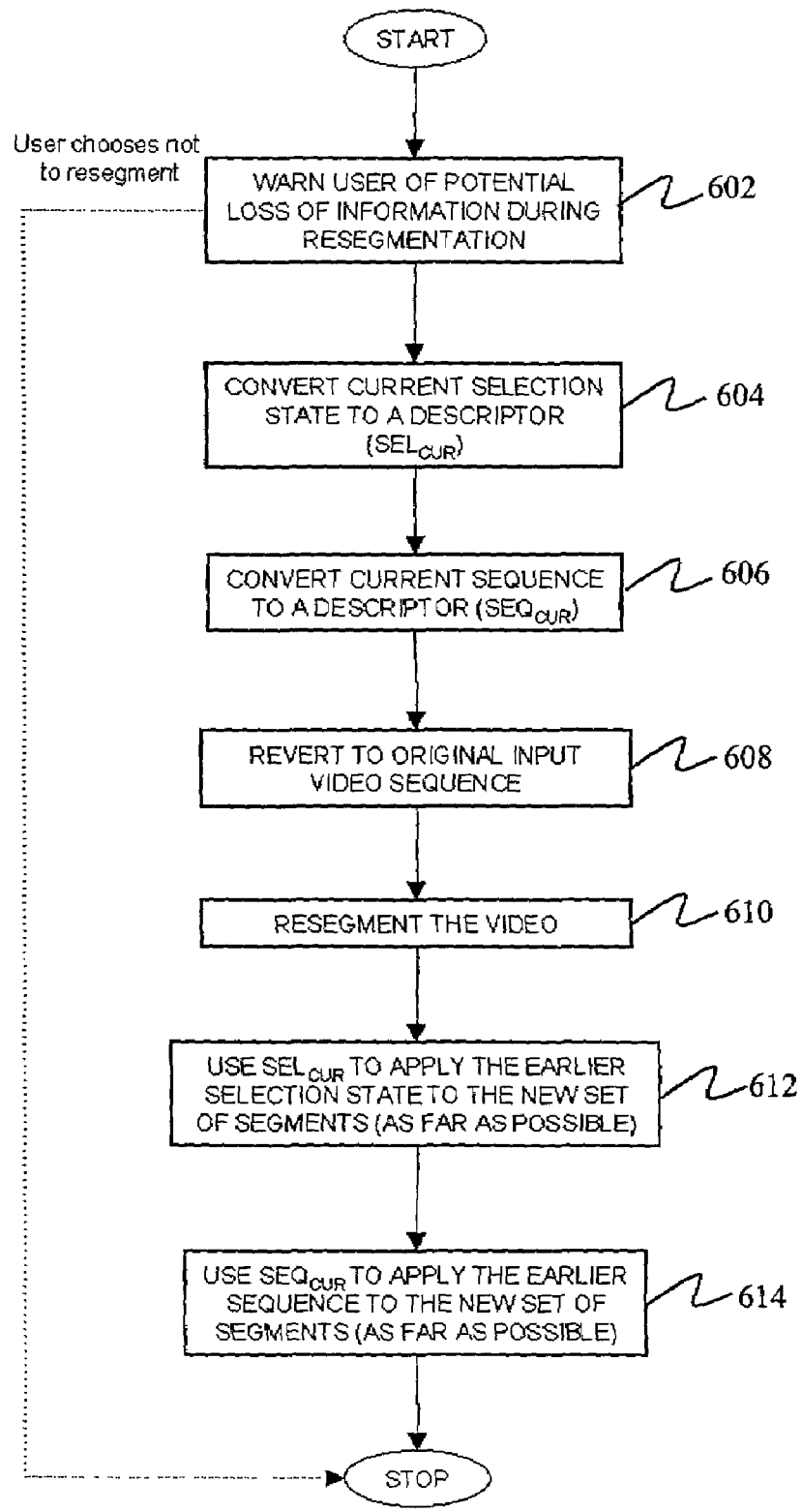
FIG. 6 is a flowchart illustrating a process for automatic segmentation of input video material in the system in FIG. 2.

With reference to FIG. 6, a re-segmentation process of this type is described. In some cases the system is not able to re-apply the current selection/sequencing after re-segmentation, or is not able to do so in the way the user expects. Therefore it is desirable to warn the user in a step 602 and allow the user to cancel the operation. If the user decides to proceed, the system first preserves the selection state ($SEL_{CUR}$) of all segments in a step 604. The system then preserves the sequence of the set of segments ($SEQ_{CUR}$) comprising the current output video production in a step 606.

The system reverts to the original selection/sequence state, i.e. that of the input video material, with all segments selected and without any re-sequencing in a step 608, and carries out the re-segmentation in a step 610. Subsequently, the system uses $SEL_{CUR}$ to apply the previous selection state to the new set of segments in a step 612 and thereafter $SEQ_{CUR}$ to sequence the new set of segments in a step 614 in the same way before re-segmentation.

The system may not always be able to perform the operations in steps 612 and 614 or the results thereof may not always be what the user expects. In general, the technique is successful in cases where the re-segmentation involves relatively small adjustments in the start and end points of the pre-existing set of segments, but is only partly useful when re-segmentation causes major shifts in the segment positions or the overall number of segments.

In a fifth system (not shown in any figure) according to a fifth embodiment of the invention, there are two Grid Windows (for example, Grid Windows 102 or 202 in FIGS. 1 and 2 respectively). The first Grid Window shows the input video material in the original state and the second Grid Window shows the segments comprising the current output video production. The first Grid Window is therefore used to re-segment the material and the second Grid Window to manipulate the selection/sequence state and to create/adjust additional descriptors. These windows are "synchronized" so that changes of segmentation in the first Grid Window are reflected automatically in the second Grid Window.

Typically each Grid Window is a slightly simplified version of the Grid Window 202 shown in FIG. 1b, where the first Grid Window does not have the Select and Sequence columns, and the second Grid Window does not have the Segment column. Also, it is generally not desirable to show the complete set of descriptors in both windows, for e.g. manual descriptors are omitted from the first Grid Window. The user controls such options according to preference.

In a sixth system according to a sixth embodiment of the invention as shown in FIGS. 2a, 2b, 2c and 2d, all three operations—Segmentation, Selection and Sequencing are performed in separate Grid Windows. The Segmentation Window 252 shows the input video material in the original state with segment boundaries 254 (dotted lines) superimposed and is used to define and adjust these segment boundaries 254. The Selection Window 260 shows the selection state of each of these segments and allows the user to change these selection states. The Sequencing Window 270 shows the selected segments in a new order comprising the output video production and allows the user to alter the sequencing. Each of the three windows may have a unique set of descriptors. The windows are synchronized so that changes of segmentation performed in the Segmentation Window 252 are reflected in the Selection Window 260 and the Sequencing Window 270, and changes in selection state performed in the Selection Window 260 are reflected in the Sequencing Window 270. A Monitor Window 280 enables playback of the video from the Segmentation Window, the Selection Window or the Sequencing Window.

In the Segmentation Window, the Selection Window and the Sequencing Window, there is a top bar 290 for providing identification of the respective window. A star 292 in each window is used to identify the descriptor on which the type of operation performed in the respective window is based. A solid line 294 in each window shows the current position within the respective window; when a window is inactive use by the user, this corresponds to the frame shown in the Monitor Window 280.

In each of the three windows, there is also shown a special descriptor known as "Input SegNum" 296 and a scale column 298. The Input SegNum descriptor 296 is the ordinal number of the segment and is calculated and displayed automatically by the system. The scale column 298 always appears as the last column in the respective window and provides the maximum and minimum values for each of the descriptors in that respective window.

As shown in FIG. 2b, the unselected segments are shaded in the Selection Window 260, and these unselected segments do not appear in the Sequencing Window 270 in FIG. 2c. Also, in the Sequencing Window 270 in FIG. 2c, the descriptor "D_Fuzzy G3" 299 contains numbers displayed at the lower left of each cell for that descriptor. These values indicate the value of the descriptor D_Fuzzy G3 for the corresponding segment.

The second group of issues concerns how to handle descriptors when the video material is re-segmented after descriptors, specifically single-value-per-segment descriptors, have been created. To illustrate the problem, consider a case where re-segmentation results in one segment where ten segments existed previously. Clearly the values of the individual descriptors for the ten segments, or their temporal scope, may be lost during re-segmentation. A less serious, but still potentially undesirable, example occurs when new segments cross-cut old segments, i.e. where the segment boundaries are shifted in the re-segmentation process. If the existing set of descriptor values is retained in such a case, there is a danger the descriptor values do not apply correctly to the segments as newly defined.

There are several ways to manage this problem, which may be applied individually or together, and apply at the point the user chooses to re-segment.

For example, extracted and derived descriptors may be recalculated because these descriptors include a generative definition, i.e. the formula, algorithm or procedure required to calculate the descriptors. In the case of extracted descriptors the new values are re-calculated from the input video material by signal analysis, and in the case of derived descriptors the new values are recalculated from other descriptors.

For descriptors which cannot be recalculated, the values for existing segments may be copied or combined to provide values for the new set of segments with a "best attempt" philosophy. For example in the case where ten segments become one, a single new value has to be derived automatically from the existing set of ten. For numerical descriptors this may be an average, or a minimum or maximum of the ten values. For non-numerical descriptors such as text strings, this may be the first of the ten values, or the most common of the ten. There are many possible variants of this approach, which may be provided as options for the user to select.

As another example, it is generally desirable to warn the user when there is any potential loss or misapplication of data. This allows the user to decide whether to proceed and if the user does decide to proceed, prompts the user to save the current status for possible later retrieval.

As a further example and a more elaborate solution, the system may support multiple segmentation instances, i.e. in which the system maintains data describing more than one set of segmentation points and the values of the descriptors for each of these multiple segmentations.

In a seventh system (not shown in any figure) according to a seventh embodiment of the invention, different sets of segmentation points for different descriptors may be maintained. This is generally most useful when there are several manual descriptors. As an example, a video shot with a sequence in which a man enters a room followed by a woman, and the two talks together for a while before the man leaves, is considered. If this video shot is described by three descriptors, "man present", "woman present", and "talking", then the temporal spans of these descriptors overlap provided the descriptors are accurately applied. Such a system maintains segmentation information for each of these 3 descriptors in this example. This feature may then be invoked in conjunction with segment selection/sequencing. For example, if the "man present" descriptor is chosen for segment selection, the input video material is automatically segmented so that the in-points of "man present" segments are at set to the exact times when the man enters, and the out-points to the exact times when the man leaves. Then, if "woman present" is chosen as the descriptor for segment selection, the video shot is re-segmented to correspond to this descriptor.

Manual Segmentation

In the above example, the issue of how to create the in and out points for the "man present" segments is raised. The solution in such a case normally lies in manual segmentation, or manually adjusted segmentation. The system provides a process in which the user may create segments and adjust segment in and out points to frame accuracy or better, for example audio sample accuracy, while viewing and auditioning the video material. This process may be achieved using well-known user interface techniques. For example, most non-linear video editors provide ways for users to create "clips" and to adjust the segments in and out points. The process may also be achieved directly in the Grid Window 202 in FIG. 1b by moving the lines between segments. For example, the user may first zoom in to the region of interest, then use the mouse to drag one of vertical lines 218 separating segments. In any system where there is support for different sets of segmentation points for different descriptors, this process may be carried out for individual descriptors. In other words, instead of moving an entire vertical line in the Grid Window 202 in FIG. 1b, the user only moves the part of the vertical line corresponding to a particular descriptor in a Grid Window of that system. To move segment boundaries in such a manner is generally meaningful only before the input video material has been re-sequenced, or where the segments on both sides of the line in the Grid Window are contiguous parts of a single shot in the input video material.

Reduction of Descriptor from Time-Series to Single-Value-Per-Segment

The system also allows the user to convert a time-series descriptor, for example the "Audio Amplitude" descriptor 210 in FIG. 1*b*, to a descriptor with one value per segment, for example like the "Shot Length" descriptor 220 in FIG. 1*b*, through a reduction process. This process is supported by a reduction utility which allows the user to select the descriptor for reduction and select a reduction rule. As examples, the single value per segment may be the average of all the time-series values for that segment, or the maximum or minimum of the time-series values, or some other such function. The user interface mechanism to enable this process may be, for example, to allow the user to select a row in FIG. 1*b* by mouse-clicking at the extreme left of the row. Thereafter the user selects a menu item entitled "Reduce to single value per segment", and select one of several reduction rules offered in a dialogue box.

Segment Hierarchies

Segments may also exist in a hierarchy. For example, an entire video production may be a segment, while at the same time the scenes that constitute the entire video production exist as other segments, and all the shots that constitute the scenes exist as yet more segments. These segments may all be presented in the display simultaneously, and this option is made available to the user in the system, but this may not be desirable because, for example, the existence of hierarchies may mean that there is duplicated video material in the output video productions.

The are two preferred working methods to allow the user to form a hierarchy of segments and these are described with reference to FIGS. 7, 8*a* and 8*b*.

Figure 7:
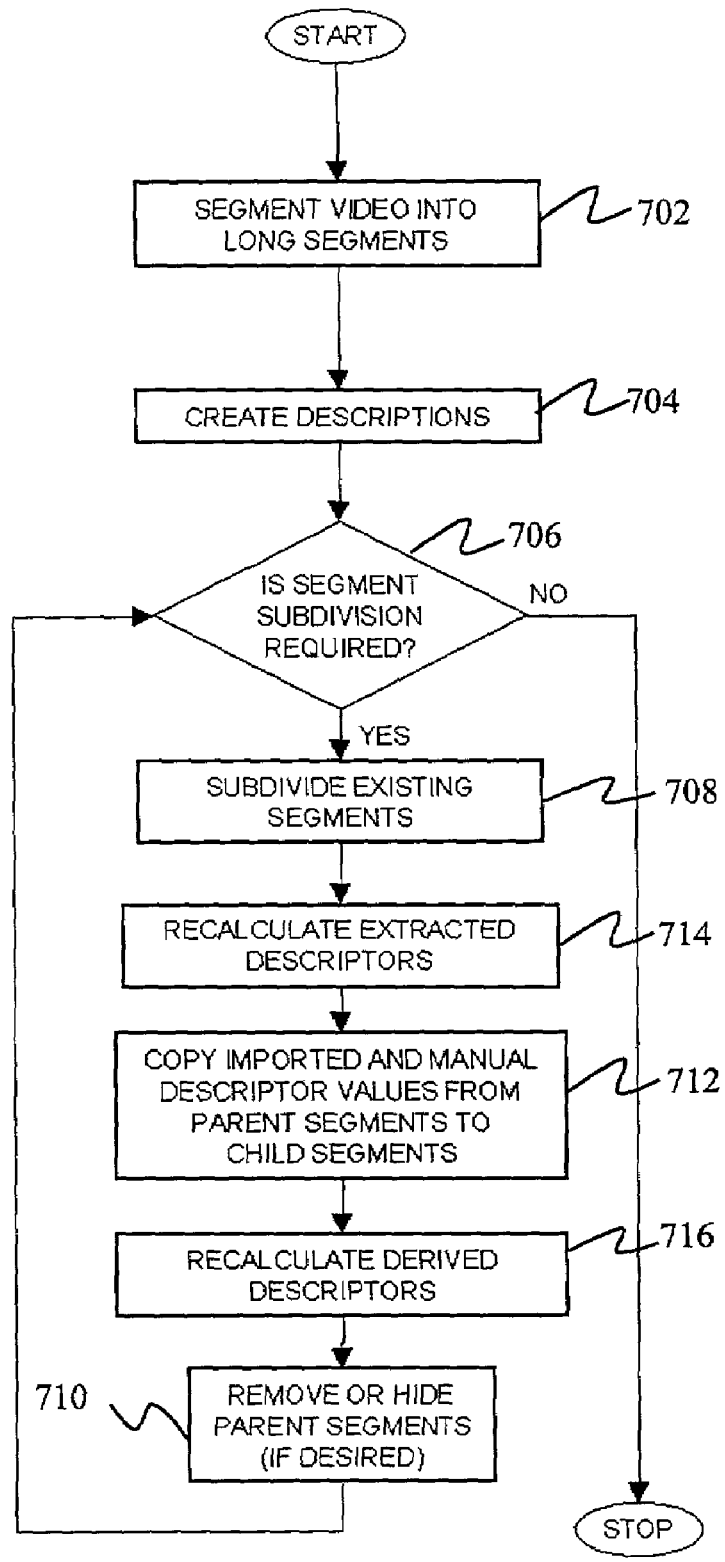
FIG. 7 is a flowchart illustrating a process for top-down decomposition of segments in the system in FIG. 2.

A first working method accords with a top-down decomposition process shown as a flowchart in FIG. 7. The user starts by segmenting the input video material into a small number of long segments in a step 702. The user applies descriptions to these long segments in a step 704, and only if required as tested in a step 706 subdivides the long segments into shorter segments in a step 708. When the user subdivides a segment the user removes or hides the "parent" segment in a step 710 to avoid conflicts such as the duplication. However, before the system performs the operation in step 710 the system supports subdivision by allowing the descriptor values of a parent segment to be propagated to all the "children" segments during the subdivision operation in a step 712. The system also performs operations where any or all of the extracted descriptors and derived descriptors are recalculated for the children segments in steps 714 and 716 respectively. The subdivision into children segments may be an automatic or manual segmentation process.

Figure 8A:
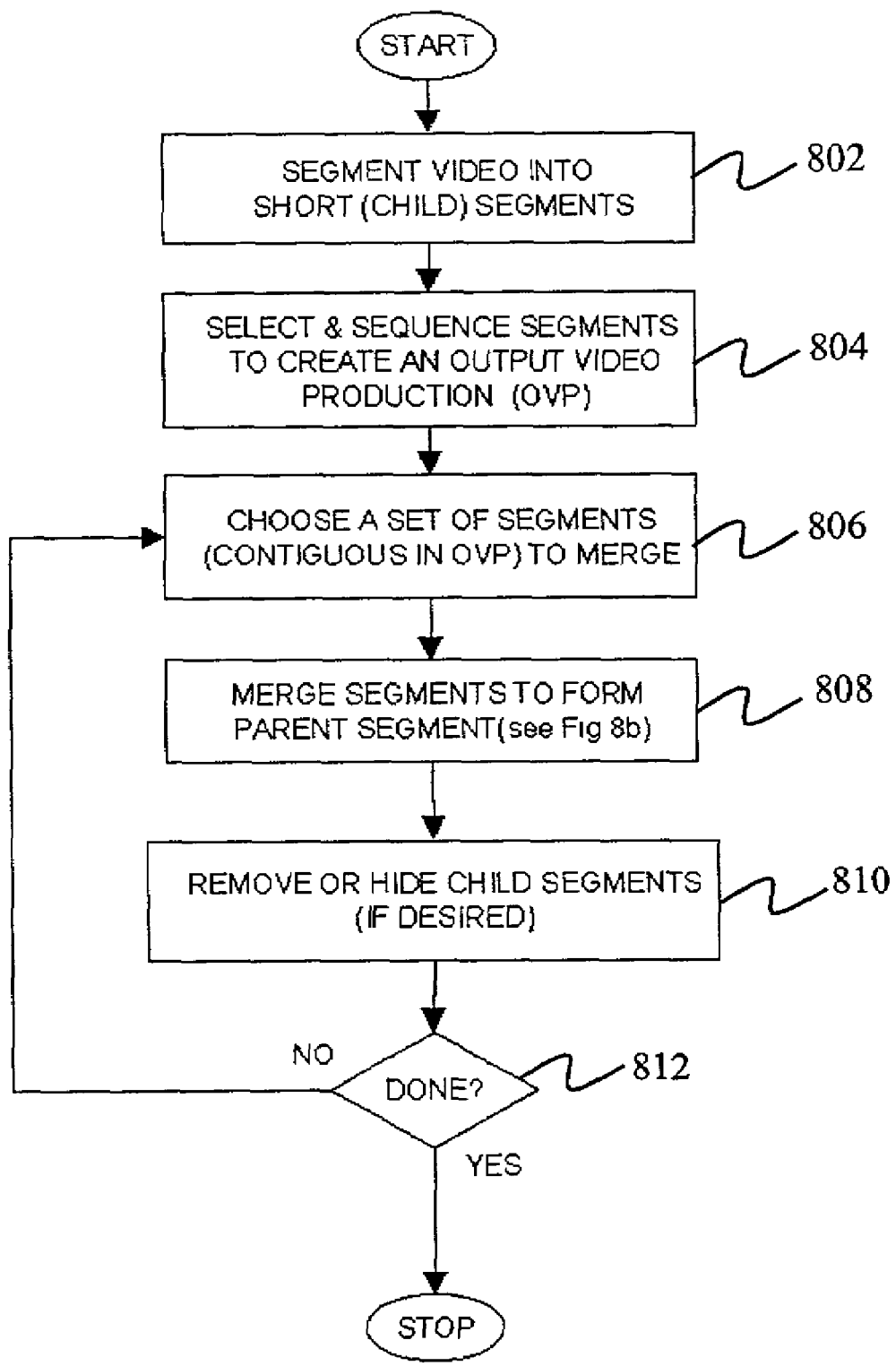
FIG. 8a is a flowchart illustrating a process for bottom-up composition of segments in the system in FIG. 2.
Figure 8B:
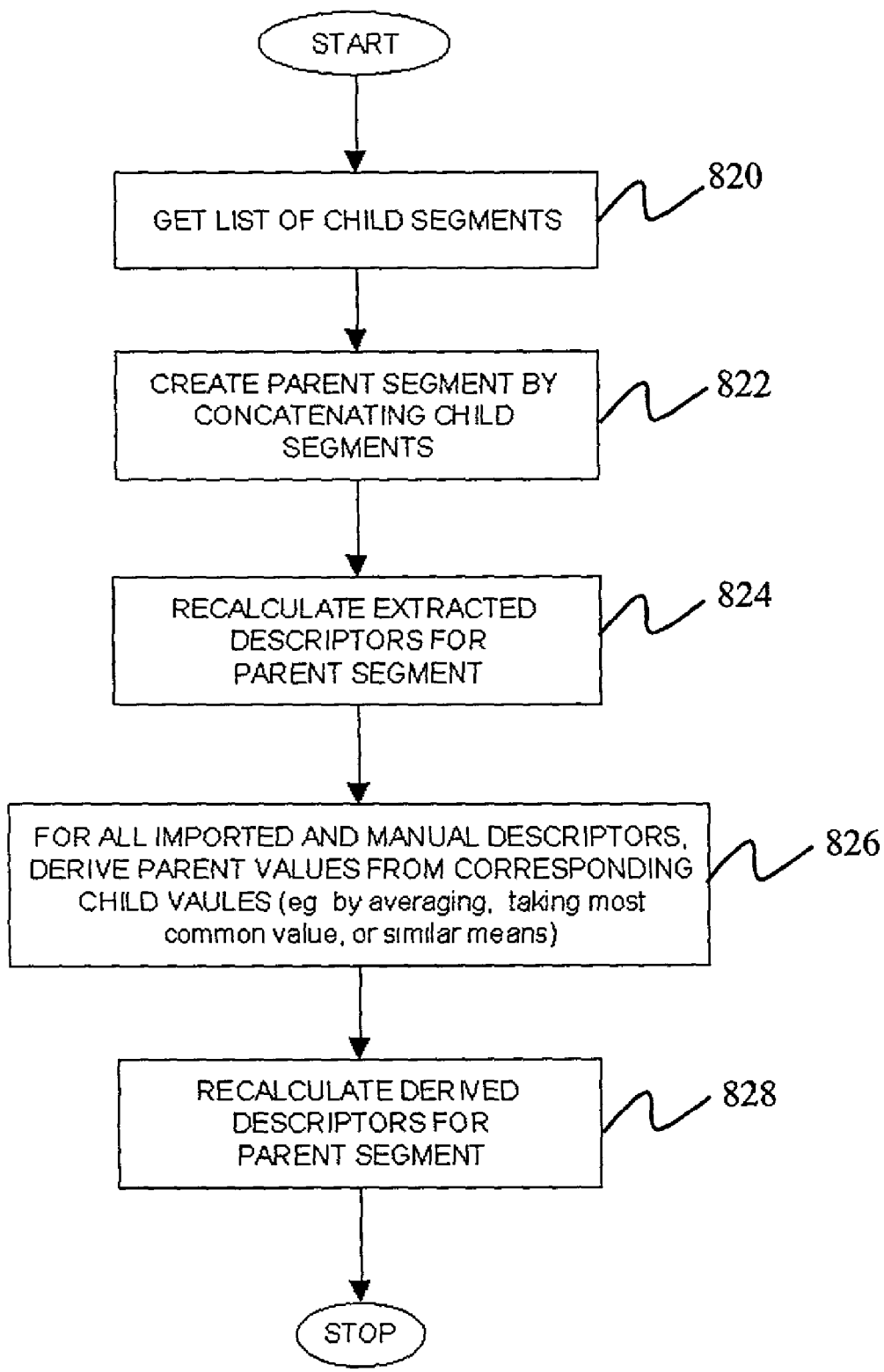
FIG. 8b is a flowchart illustrating a process for merging segments in the system in FIG. 2.

A second working method accords with a bottom-up composition process shown as flowcharts in FIGS. 8*a* and 8*b*. The process is described with reference to FIG. 8*a* using a scenario that involves a number of segments which are typically many short segments, for which descriptors have been instantiated and which have been subjected to selection and sequencing in order to form an output video production. The objective of the composition process is to merge together groups of segments in order to form parent segments, thus simplifying the representation of the output video production.

In the case of bottom-up composition, the user initially segments the video material into a set of video segments known as child segments in a step 802. The user creates an output video production in a step 804 by the process of selecting and sequencing described hereinbefore. Thereafter the user chooses a set of child segments which are to be merged in a step 806 where the segments chosen are contiguous in the current output video production. The user subsequently instructs the system to merge the segments to form a parent segment in a step 808.

Once a parent segment is formed, the user optionally instructs the system to remove or hide the set of child segments which were merged to form the parent in a step 810. The user continues merging different groups of contiguous segments if required as tested in a step 812.

The operation performed by the system in step 808 is described in further details with reference to FIG. 8*b*. The system obtains the list of segments that are to be merged in a step 820. The system thereafter creates a parent segment by concatenating the child segments in a step 822. More specifically, the system creates a new segment with an output video production start time equal to the start time of the first child segment and the duration of which equals the sum of the duration of all the child segments.

The system recalculates all extracted descriptors for the parent segment using the formula/algorithm for each descriptor in a step 824. Then, in the case of imported and manual descriptors, the system derives values of each descriptor for the parent segment from the values of the corresponding descriptor in each child segment in a step 826. This operation may be performed using one of several user-selectable methods. For example, in the case of a numeric descriptor a mean value may be used, while in the case of string descriptor the preferred option is typically to select the value of the string found most frequently in the set of child segments. There is usually some information loss during this operation which the user accepts in exchange for the simpler representation.

Once all extracted descriptors have been recalculated and the imported and manual descriptors have been assigned values for the parent segment, the system calculates the set of derived descriptors for the parent segment in a step 828.

In many cases the user may use both working methods by starting predominantly with the top-down decomposition process as the user analyses and annotates the input video material, and subsequently moving onto the bottom-up composition process as the user creates the output video production.

The system may include a representation of the segment hierarchy in the data structures of the system. This provides additional possibilities such as flexible merging and unmerging of segments in which the user may collapse children segments to a single parent segment and subsequently may explode the parent segment again as children, with different but generally related descriptions existing at each level in the hierarchy. When a multiple-level representation of this kind is stored in the data structures of the system, there will be no loss of data, nor any need for the system to recalculate data, as the user alternates between merged and exploded views.

Furthermore, the system may also allow several different hierarchies of segments to co-exist, one for the input video material in which a parent segment consists of a set of children segments which are contiguous in the input video material, and others representing alternative hierarchical clustering of the segments. The alternative clustering of segments may, for example, correspond to one or more possible output video productions in which a parent segment consists of a set of children segments which are contiguous in one possible output video production.

Selection

The selection function is an important part of any system according to any one of the embodiments of the invention. Segment selection defines which segments appear in the output video production. By default, all segments are selected, but segments are excluded from the output video production if these segments are unselected.

The selection function shares several things in common with the segmentation function therein. For example, selection may be performed automatically according to descriptor value or performed manually. In the case of manual selection, the selection state, whether selected or unselected, may be controlled by, for example, right-clicking at the extreme top of a segment column in the Grid Window 202 of FIG. 1b and choosing from either "select segment" or "deselect segment" options.

Figure 9:
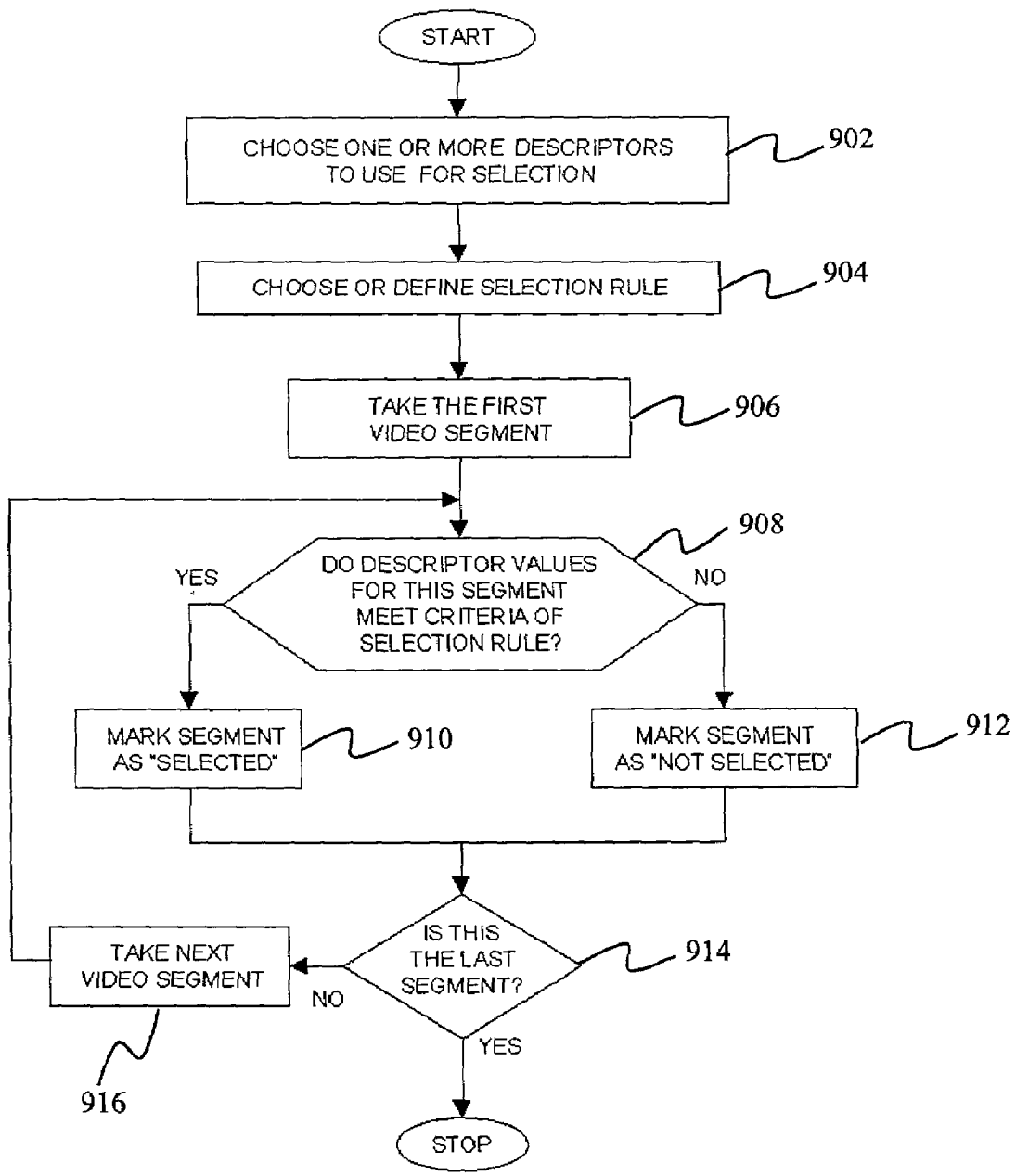
FIG. 9 is a flowchart illustrating a process for automatic segment selection in the system in FIG. 2.

The process of automatic control of selection by descriptor value is described with reference to a flowchart in FIG. 9. The process involves incorporating or creating descriptors and choosing one or more of such descriptors to control the selection process in a step 902. Rules which govern how the descriptor values translate into selection decisions are then defined in a step 904. A typical segmentation rule is a Match Select rule where a segment is selected if the value of a descriptor exactly matches a given target value. Another typical rule is a Proximity Select rule where a segment is selected if the value of a descriptor differs from a given target value by less than a certain limit amount. A further typical rule is a Range Select rule where a segment is selected if the value of a descriptor falls within a given range.

As in the case of segmentation, the selection mechanism may be made dependent on the values of multiple descriptors by combining single descriptor rules with the Boolean relationships AND, OR & NOT.

After defining the selection rules to apply to the segments, a segment is identified by the system in a step 906 and tested in a step 908 if the descriptor value of the identified segment meet the criteria according to the selection rules. Depending on whether the descriptor of the identified segment meets the criteria, the identified segment is marked "Selected" in a step 910 or "Unselected" in a step 912. The system then checks if the marked segment is the last segment to be tested against the selection rules in a step 914. If there is another untested segment the system identifies this segment in a step 916 and loops back to step 908 thereafter.

To perform automatic selection, the system may use not only scalar descriptors, but also more complex descriptors such as vectors, matrices and strings.

Sequencing

The sequencing function is an important part of any system according to any one of the embodiments of the invention. A segment sequence is the order of segments in an output video production. At any time, the current output video production consists of the set of selected segments in the current sequence. The current sequence is the order in which segments appear, i.e. from left to right, in the Grid Window 202 in FIG. 1b and Overview Window 106 in FIG. 1a.

Sequencing may be performed automatically according to descriptor values or performed manually. In the case of manual sequencing, the order may be determined by an operation such as dragging and dropping segments. For example, by clicking at the extreme top of a segment column in the Grid Window 202 of FIG. 1b and dragging the column horizontally to another location, manual sequencing is performed.

Figure 10:
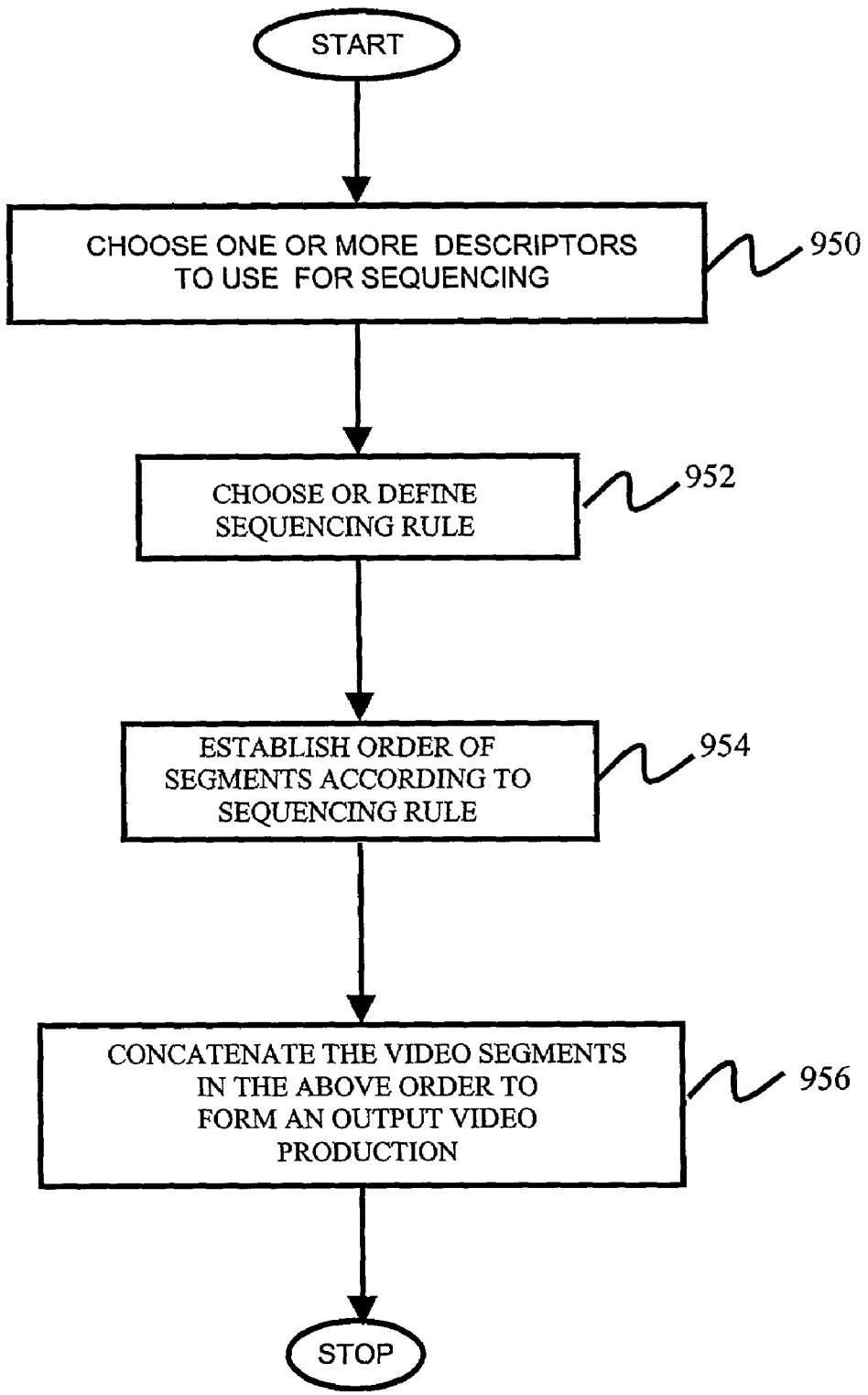
FIG. 10 is a flowchart illustrating a process for automatic sequencing based on descriptor values.

The process of automatic control of sequencing by descriptor value is described with reference to a flowchart in FIG. 10. The process involves incorporating or creating descriptors and choosing one or more descriptors to control the sequencing process in a step 950. Rules which govern how the descriptor values translate into a sequencing decision are defined in a step 952. A typical rule is a Sort-by-Value rule where segments are sorted according to the value of a descriptor, for example from lowest to highest value or vice versa. Another typical rule is a Sort-by-Distance rule where segments are sorted according to how much a descriptor value differs from a given target value, for example the simple numeric difference or a Euclidean distance. This rule is particularly powerful as the rule may be used to sort segments according to the segments' similarity to a target segment.

Like the segmentation and selection functions, the sequencing function may be made dependent on the values of multiple descriptors. The multiple descriptors sequencing function may be performed by combining the descriptors in formulaic/algorithmic ways described hereinbefore. The sequencing mechanism may also involve a hierarchical sort in which the sequencing is first determined by the value of one descriptor, but relies on other descriptors when the first descriptor has the same value for many segments. This is analogous to the process of sorting words alphabetically where words are sorted based on the first letter, then within that the words are sorted based on the second letter, and so on.

The sequencing rule is then used to establish an order for all selected segments in a step 954. In step 956, the segments are concatenated in this order to produce an output video production.

To perform automatic sequencing, the system may use not only scalar descriptors, but also more complex descriptors such as vectors, matrices and strings.

Figure 11:
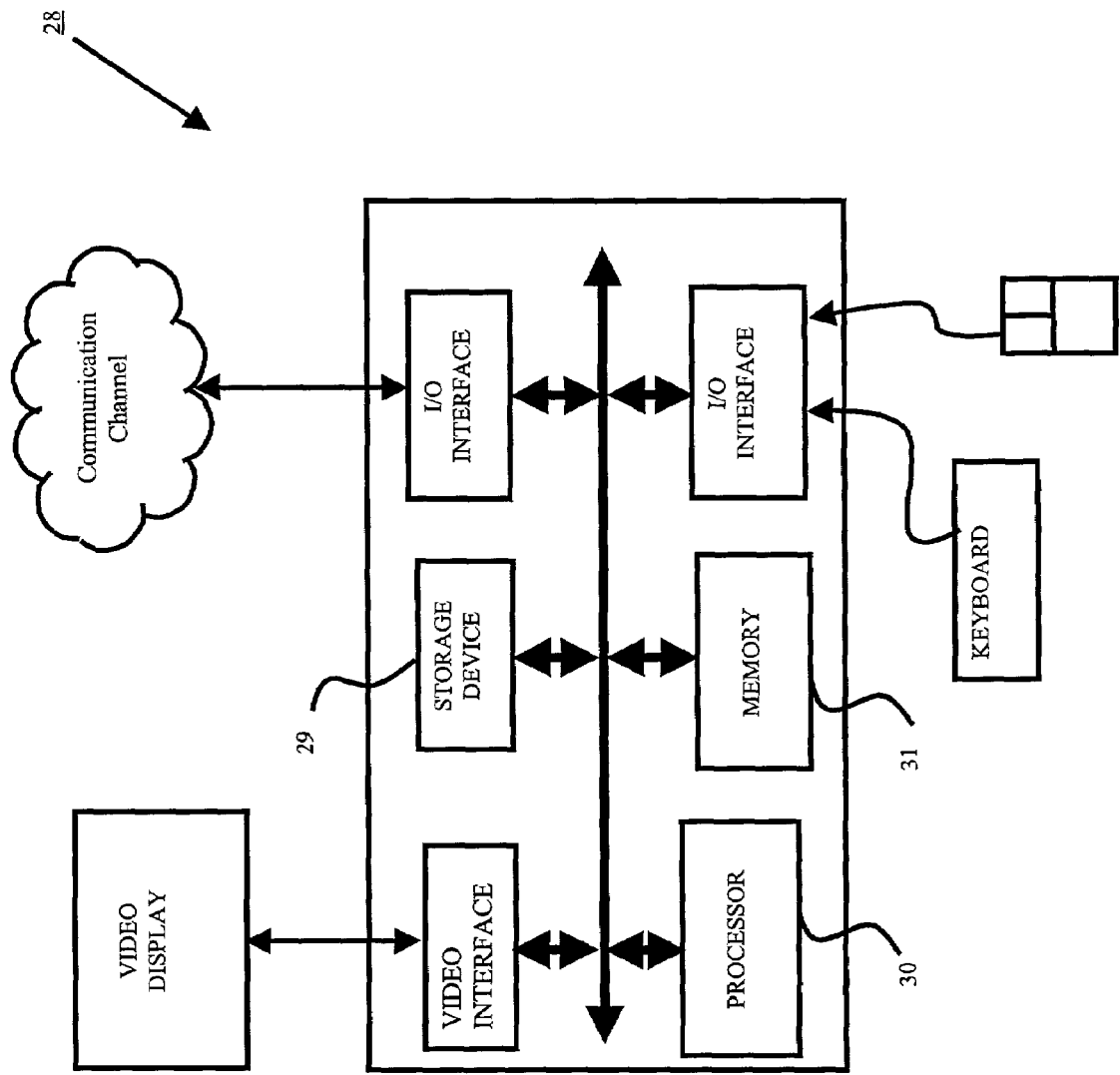
FIG. 11 illustrates a general-purpose computer by which the embodiments of the invention are preferably implemented.

The embodiments of the invention are preferably implemented using a computer, such as the general-purpose computer shown in FIG. 11. In particular, the functionality or processing by the system described with reference to FIGS. 1 to 10 may be implemented as software, or a computer program, executing on the computer. The system and method for video production are effected by instructions in the software that are carried out by the computer. The software may be implemented as one or more modules for implementing the process steps. A module is a part of a computer program that usually performs a particular function or related functions. Also, as described in the foregoing, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects an advantageous apparatus for providing a low data transmission rate and intelligible speech communication in accordance with the embodiments of the invention.

The system 28 is simply provided for illustrative purposes and other configurations can be employed without departing from the scope and spirit of the invention. Computers with which the embodiment can be practiced include IBM-PC/ATs or compatibles, one of the Macintosh™ family of PCs, Sun Sparcstation™, a workstation or the like. The foregoing is merely exemplary of the types of computers with which the embodiments of the invention may be practiced. Typically, the processes of the embodiments, described hereinafter, are resident as software or a program recorded on a hard disk drive (generally depicted as block 29 in FIG. 11) as the computer readable medium, and read and controlled using the processor 30. Intermediate storage of the program and any data may be accomplished using the semiconductor memory 31, possibly in concert with the hard disk drive 29.

In some instances, the program may be supplied to the user encoded on a CD-ROM or a floppy disk (both generally depicted by block 29), or alternatively could be read by the user from the network via a modem device connected to the computer, for example. Still further, the software can also be loaded into the computer system 28 from another computer readable medium, including magnetic tape, a ROM or integrated circuit, a magneto-optical disk, a computer readable card such as a PCMCIA card. The foregoing is merely exemplary of relevant computer readable mediums. Other computer readable mediums may be practiced without departing from the scope and spirit of the invention.

In the foregoing manner, a method, a system and a computer program product for video re-purposing, editing and archiving for a video production are disclosed. A number of embodiments are described. However, it will be apparent to one skilled in the art in view of this disclosure that numerous changes and/or modification can be made without departing from the scope and spirit of the invention.

The invention claimed is:

1. A system for creating an output video production automatically from a body of input video material comprising multiple segments, said system including:
   computerized digital signal processing means for automatically performing one or more digital signal processing algorithms implemented in computer software or hardware on visual data comprised in said input video material to derive at least one descriptor value for each of a plurality of first descriptors for each of a plurality of said segments of the input video material;
   user-interface means enabling a user to combine said descriptor values of said first descriptors in order to create descriptor values for at least one further descriptor;
   user-interface means enabling a user to choose from among said first descriptors and/or said further descriptors one or more descriptors to be used for automatic segment selection;
   user-interface means enabling a user to define or choose a segment selection rule to be used for automatic segment selection;
   automatic selection means for using the defined or chosen selection rule and said descriptor values to select, from among the plurality of video segments, at least two said video segments of the input video material;
   automatic sequencing means for using a sequencing rule and said descriptor values of said selected descriptors for at least two selected video segments to derive a sequencing order in which to present said at least two selected segments, said at least two selected segments being permuted in the sequencing order relative to the sequence of the at least two segments in the input video material;
   assembly means for assembling an output video production by including the selected video segments in the sequencing order; and
   playback means which plays said output production;
   whereby a user may create and view different output productions by repeatedly applying different combinations of descriptors and selection rules.

2. The system as in claim 1, further including means for displaying at least one grid, each of said at least one grid having reference representations of the plurality of video segments for a first axis and at least one first descriptor corresponding to the plurality of video segments for a second axis, wherein each cell in said at least one grid displays a representation of at least one descriptor value ascribed to one of said at least one first descriptors corresponding to one of the plurality of video segments.

3. The system as in claim 2, wherein said at least one grid includes a plurality of rows, said plurality of rows including:
   a row visually representing the plurality of video segments;
   a row visually representing audio content of the plurality of video segments; and
   a row providing time-series graphical representations of a plurality of descriptor values corresponding to one of the plurality of video segments,
   wherein the temporal extent of each of the plurality of video segments is indicated in one of said plurality of rows.

4. The system as in claim 3, wherein said at least one grid further includes first and second grid, wherein when said input video material is input into said system, said first grid represents said input video material in substantially an original state and second grid represents said output video production, and a change to said first grid causes a corresponding change to said second grid.

5. The system as in claim 1, further including means for creating transitions between selected video segments.

6. The system as in claim 5, wherein said means for creating transitions includes means for creating video dissolves or audio cross fades between selected video segments.

7. The system as in claim 1, further comprising means for importing a descriptor from the input video material and ascribing at least one value for said imported descriptor to each segment of the input video material, wherein said at least one value is created prior to importation into said system.

8. The system as in claim 1, wherein said computerized digital signal processing means includes means for creating said at least one descriptor value for each video segment by assigning an ordinal number to each of the segments of the input video material in accordance with the position of the respective video segments in the plurality of segments of the input video material.

9. The system as in claim 1, wherein said computerized digital signal processing means includes means for ascribing said at least one descriptor value to each segment of the input video material by using a formula or algorithm having a reference to at least a second descriptor value.

10. The system as in claim 1, further including means for segmenting an input video material into the plurality of video segments by enabling definition or adjustment of start and end times of a video segment by direct user manipulation.

11. The system of claim 1, further including means for deriving a single value from a plurality of temporally successive values of a descriptor corresponding to one of said plurality of video segments.

12. The system as in claim 1, wherein said automatic selection means for selecting at least two video segments includes a selection rule which selects said at least two video segments according to whether said at least one descriptor value for each segment lies substantially within a range of target values.

13. The system as in claim 1, wherein said automatic sequencing means for deriving a sequencing order comprises means for ordering said at least two selected video segments according to the difference between said at least one descriptor value for each respective selected video segment and a target value.

14. The system as in claim 1, wherein said user-interface means enabling a user to choose or define a segment selection rule permits the user to choose the selection rule from a predefined set of selection rules.

15. The system as in claim 1, wherein said automatic sequencing means further includes means for choosing the sequencing rule from a predetermined set of sequencing rules.

16. The system as in claim 1, further including means for defining the segments of the input video material, said means including:
   means for obtaining at least two time series descriptors in the form of time series data, each time series descriptor representing the value of a characteristic of the input video material at each of a series of successive time periods; and
   means for using at least one of the time-series descriptors to derive a set of segment boundary times, the segment boundary times defining said segments of the input video material;
   wherein said means for obtaining descriptor values automatically obtains at least one descriptor value for each of said segments of the input video material by using at least a second of the time series descriptors.

17. The system as in claim 1, wherein said computerized digital signal processing is operative to obtain a first said descriptor value for each of said segments; said system further including:
   means for ascribing at least one second descriptor value to at least a first of said segments;
   means for grouping said first segment with at least one other of the segments according to the values of said first descriptor value, and
   means for selectively copying said second descriptor value to said one or more other segments.

18. The system as in claim 1, further comprising:
   data input means for receiving instructions from the user to perform at least one of:
   (i) incorporating additional descriptors; and
   (ii) creating one or more further descriptors having descriptor values derived from previously-obtained descriptor values;
   said automatic selection means said automatic sequencing means and said assembly means being arranged to generate a modified output production.

19. A method performed by a programmed computer for creating an output video production automatically from a body of input video material comprising multiple segments, the method including the steps of:
   (a) automatically performing one or more digital signal processing algorithms implemented in the programmed computer on visual data shot by a video camera and comprised in said input video material to derive at least one descriptor value for each of a plurality of first descriptors for each of a plurality of said segments of the input video material;
   (b) receiving input from a user to combine said descriptor values of said first descriptors in order to create descriptor values for at least one further descriptor;
   (c) receiving input from a user to choose from among said first descriptors and/or said further descriptors one or more descriptors to be used for automatic segment selection;
   (d) receiving user input to define or choose a segment selection rule to be used for automatic segment selection;
   (e) using a selection rule and said descriptor values to select, from among the plurality of video segments, at least two video segments;
   (f) using a sequencing rule and said descriptor values of said at least two selected video segments to derive a sequencing order in which to present said at least two selected segments, said at least two selected segments being permuted in the sequencing order relative to the order of the at least two selected segments in the input video material, and
   (g) assembling the output video production including the selected video segments in the sequencing order; and
   (h) playing said output production to a user using a video display device;
   whereby a user may create and view different output productions by repeatedly applying different combinations of descriptors and selection rules, and then performing steps (e) to (h) again.

20. The method as in claim 19, further including the step of displaying at least one grid, each of said at least one grid having reference representations of the plurality of video segments for a first axis and at least one first descriptor corresponding to the plurality of video segments for a second axis, wherein each cell in said at least one grid displays a representation of at least one descriptor value ascribed to one of said at least one first descriptors corresponding to one of the plurality of video segments.

21. The method as in claim 20, wherein said step of displaying said at least one grid includes the step of displaying a plurality of rows, said plurality of rows including:
   a row visually representing the plurality of video segments;
   a row visually representing audio content of the plurality of video segments; and
   a row providing time-series graphical representations of a plurality of descriptor values corresponding to one of the plurality of video segments,
   wherein the temporal extent of each of the plurality of video segments is indicated in one of said plurality of rows.

22. The method as in claim 21, wherein said step of displaying said at least one grid includes the step of displaying first and second grids, wherein when the input video material is provided, said first grid represents the input video material in substantially an original state and said second grid represents said output video production, and a change to said first grid causes a corresponding change to said second grid.

23. The method as in claim 19, further including the step of creating transitions between said selected video segments.

24. The method as in claim 23, wherein said step of creating transitions includes the step of creating video dissolves or audio cross fades between said selected video segments.

25. The method as in claim 19, further including a step of importing from the input video material a descriptor and at least one value for said imported descriptor which is ascribed to each segment of the input video material wherein said at least one value is created prior to importation.

26. The method as in claim 19, wherein said step of performing one or more digital signal processing algorithms is performed by assigning an ordinal number to each of the segments of the input video material in accordance with the position of the respective video segments in the plurality of segments of the input video material.

27. The method as in claim 19, wherein said step of performing one or more digital signal processing algorithms is performed by ascribing said at least one descriptor value to each segment of the input video material by using a formula or algorithm having a reference to at least a second descriptor value.

28. The method as in claim 19, including the further step performed before step (a) of segmenting the input video material into video segments by enabling definition or adjustment of start and end times of a video segment by direct user manipulation.

29. The method as in claim 19, including the further step of deriving a single value from a plurality of temporally successive values of a descriptor corresponding to one of said at least two video segments.

30. The method as in claim 19, wherein said selection rule in said step (e) of selecting at least two video segments includes selecting said at least two video segments according to whether said at least one descriptor value for each segment lies substantially within a range of target values.

31. The method as in claim 19, wherein said sequencing rule in said step (f) of deriving a sequencing order includes the step of ordering said at least two selected video segments according to the difference between said at least one descriptor value for each respective selected video segment and a target value.

32. A method as in claim 19 in which step (d) includes choosing the selection rule from a predefined set of selection rules.

33. A method as in claim 19 including a further step of choosing the sequencing rule from a predetermined set of sequencing rules.

34. The method as in claim 19, including the further steps, performed before step (a), of defining the segments of the input video material by:
    obtaining at least two time series descriptors in the form of time series data, each time series descriptor representing the value of a characteristic of the input video material at each of a series of successive time periods;
using at least one of the time-series descriptors to derive a set of segment boundary times, the segment boundary times defining said segments of the input video material; and
    said step (a), of obtaining at least one descriptor value for each said segments of the input video material, being performed automatically using at least a second of the time series descriptors.

35. A method according to claim 19 in which said step (a) of performing automatic signal analysis of said input video material to obtain at least one descriptor value for each of said segments of the input video material includes obtaining a first said descriptor value for each of said segments;
    said method further including the steps of:
        ascribing at least one second descriptor value to at least a first of said segments;
        grouping said first segment with at least one other of the segments according to the values of said first descriptor value,
        selectively copying said second descriptor value to said one or more other segments.

36. A method according to claim 19 including, at least once, performing the further steps, after step (h), of:
    (i) receiving instructions from the user to perform at least one of:
    incorporating additional descriptors; and
    creating one or more further descriptors having descriptor values derived from previously-obtained descriptor values; and
    (j) repeating steps (e) to (h) to obtain a modified output production.

37. A computer program product for creating an output video production automatically from a body of input video material comprising multiple segments, said product including:
    a computer usable medium having computer readable program code means stored in said medium for processing said input video material, said computer program product having:
    computer readable program code means for performing one or more digital signal processing algorithms on visual data comprised in said input video material to obtain at least one descriptor value for each of a plurality of first descriptors for each of a plurality of segments of the input video material;
    computer readable program code means for generating a user interface enabling a user to combine said descriptor values of said first descriptors in order to create descriptor values for at least one further descriptor;
    computer readable program code means for generating a user interface enabling a user to choose from among said first descriptors and/or said further descriptors one or more descriptors to be used for automatic segment selection;
    computer readable program code means for generating a user interface enabling a user to define or choose a segment selection rule to be used for automatic segment selection;
    computer readable program code means for using a selection rule and said descriptor values to select, from among the plurality of video segments, at least two video segments;
    computer readable program code means for using a sequencing rule and said descriptor values of said at least two selected video segments to derive a sequencing order in which to present said at least two selected segments, said at least two selected segments being permuted in said sequencing order relative to the order of said at least two selected segments in the input video material, and
    computer readable program code means for assembling an output video production by including the selected video segments in the sequencing order; and
    computer readable playback code means for playing said output production;
whereby a user may create and view different output productions by repeatedly applying different combinations of descriptors and selection rules.

38. The product as in claim 37, further including computer readable program code means for displaying at least one grid, each of said at least one grid having reference representations of the plurality of video segments for a first axis and said at least one first descriptor corresponding to the plurality of video segments for a second axis, wherein each cell in said at least one grid displays a representation of at least one descriptor value ascribed to one of said at least one first descriptors corresponding to one of the plurality of two video segments.

39. The product as in claim 37, wherein said computer readable program code means for display said at least one grid, includes computer readable program code means for displaying a plurality of rows, said plurality of rows including:
    a row visually representing the plurality of two video segments;
    a row visually representing audio content of the plurality of video segments; and
    a row providing time-series graphical representations of a plurality of descriptor values corresponding to one of the plurality of video segments,
wherein the temporal extent of each of the plurality of video segments is indicated in one of said plurality of rows.

40. The product as in claim 39, wherein said computer readable program code means for displaying said at least one grid further includes computer readable program code means for displaying first and second grids, wherein when the input video material is provided, said first grid represents said input video material in substantially an original state and second grid represents said output video production, and a change to said first grid causes a corresponding change to said second grid.

41. The product as in claim 37, further including computer readable program code means for creating transitions between selected video segments.

42. The product as in claim 41, wherein said computer readable program code means for creating transitions includes computer readable program code means for creating video dissolves or audio cross fades between selected video segments.

43. The product as in claim 37, further including computer readable program code means for importing a descriptor from the input video material and at least one value for said imported descriptor which is ascribed to each segment of the input video material, wherein said at least one value is created prior to importation.

44. The product as in claim 37, wherein said computer readable program code means for performing one or more digital signal processing algorithms includes computer readable program code means for creating said at least one descriptor value for each video segment by assigning an ordinal number in accordance with the position of the respective video segments in the plurality of segments of the input video material.

45. The product as in claim 37, wherein said computer readable program code means for performing one or more digital signal processing algorithms includes computer readable program code means for ascribing said at least one descriptor value to each segment of the input video material by using a formula or algorithm having a reference to at least a second descriptor value.

46. The product as in claim 37, wherein said computer readable program code means for segmenting includes computer readable program code means for identifying and representing a different set of video segments for each of said at least one descriptor.

47. The product as in claim 37, further including computer readable program code means for segmenting the input video material into the plurality of video segments by enabling definition or adjustment of start and end times of a video segment by direct user manipulation.

48. The product as in claim 37, further including computer readable program code means for deriving a single value from a plurality of temporally successive values of a descriptor corresponding to one of said plurality of video segments.

49. The product as in claim 37, wherein said computer readable program code means for selecting said at least two video segments selection rules which select said at least two video segments according to whether said at least one descriptor value lie substantially within a range of target value.

50. The product as in claim 37, wherein said computer readable program code means for deriving a sequencing order includes computer readable program code means for ordering said at least two selected video segments according to the difference between said at least one descriptor value for each respective selected video segment and a target value.

51. The product as in claim 37, wherein said computer readable program code means for generating a user interface enabling a user to define or choose a segment selection rule permits a user to choose the selection rule from a predefined set of selection rules.

52. The product as in claim 37, wherein said computer readable program code means for deriving a sequencing order further includes computer readable program code means for choosing the sequencing rule from a predetermined set of sequencing rules.

53. The product as in claim 37, further comprising computer readable program code means for segmenting the input video material into the plurality of video segments, said means including
  computer readable program code means for obtaining at least two time series descriptors in the form of time series data, each time series descriptor representing the value of a characteristic of the input video material at each of a series of successive time periods; and
  computer readable program code means for means for using at least one of the time-series descriptors to derive a set of segment boundary times, the segment boundary times defining said segments of the input video material;
  wherein said computer readable program code means for means for obtaining said descriptor values automatically obtains at least one descriptor value for each of said segments of the input video material by using at least a second of the time series descriptors.

54. The product as in claim 37, wherein said computer readable program code means for performing automatic material analysis of said input video material to obtain at least one descriptor value is operative to obtain a first said descriptor value for each of said segments;
  said product further including:
    computer readable program code means for ascribing at least one second descriptor value to at least a first of said segments;
    computer readable program code means for grouping said first segment with at least one other of the segments according to the values of said first descriptor value, and
    computer readable program code means for selectively copying said second descriptor value to said one or more other segments.

55. The product according to claim 37, further comprising computer readable program code means for performing at least once the further steps of:
  receiving instructions from the user to perform at least one of:
  (i) incorporating additional descriptors; and
  (ii) creating one or more further descriptors having descriptor values derived from previously-obtained descriptor values; and
  using said computer readable program code means for selecting at least two video segments, deriving a sequencing order and assembling an output video production to obtain a modified output production.

56. A system for creating an output video production from an input video material, the system comprising:
  means for obtaining at least two time series descriptors in the form of time series data, each of said time series descriptors representing the value of a characteristic of the input video material at each of a series of successive time periods;
  means for using at least one of the time-series descriptors to derive a set of segment boundary times, the segment boundary times defining a plurality of segments of the input video material;

means for applying a descriptor reduction rule to at least a second one of the time series descriptors to obtain automatically at least one segment descriptor for each of said segments of the input video material, the or each segment descriptor having a single value for each respective segment of the input video material;

means for using a selection rule and said descriptor values to select, from among the plurality of video segments, at least two segments; and means for assembling the output video production including the selected video segments.

57. A method performed by a programmed computer for creating an output video production from input video material shot by a video camera, the method including the steps of:
  (a) the programmed computer obtaining at least two time series descriptors in the form of time series data, each of said time series descriptors representing the value of a characteristic of the input video material at each of a series of successive time periods;
  (b) using at least one of the time-series descriptors to derive a set of segment boundary times, the segment boundary times defining a plurality of segments of the input video material;
  (c) applying a descriptor reduction rule to at least a second one of the time series descriptors to obtain automatically at least one segment descriptor for each of said segments of the input video material, the or each segment descriptor having a single value for each respective segment of the input video material; and
  (d) using a selection rule and said descriptor values to select, from among the plurality of video segments, at least two segments;
  (e) assembling the output video production including the selected video segments; and
  (f) playing the output video production to a user using a video display device.

\* \* \* \* \*